US006540109B1

(12) United States Patent
Klima et al.

(10) Patent No.: US 6,540,109 B1
(45) Date of Patent: *Apr. 1, 2003

(54) RECHARGEABLE CONTAINERS AND DISPENSERS

(75) Inventors: William L. Klima, Stafford, VA (US); Walter F. Klima, Jr., Travelers Rest, SC (US)

(73) Assignee: Sunpat L.L.C., Stafford, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/192,317

(22) Filed: Nov. 16, 1998

Related U.S. Application Data

(63) Continuation of application No. 08/897,838, filed on Jul. 21, 1997, now Pat. No. 5,836,479, which is a continuation-in-part of application No. 08/808,575, filed on Feb. 28, 1997, and a continuation-in-part of application No. 08/507,691, filed on Jul. 25, 1995, now abandoned, and a continuation-in-part of application No. 08/485,254, filed on Jun. 7, 1995, now Pat. No. 5,890,624, and a continuation-in-part of application No. 08/279,978, filed on Jul. 25, 1994, now Pat. No. 5,529,216.

(51) Int. Cl.[7] ................................................. B67D 5/00
(52) U.S. Cl. ...................... 222/83.5; 239/130; 239/325; 239/383.1
(58) Field of Search .......................... 222/82, 83, 129, 222/212, 525, 523, 522, 136, 325, 130, 145.5; 239/333, 304, 305; 220/254

(56) References Cited

U.S. PATENT DOCUMENTS

| | | | | |
|---|---|---|---|---|
| 3,655,096 A | * | 4/1972 | Easter | 222/82 |
| 3,968,872 A | * | 7/1976 | Cavazza | 222/83 |
| 5,285,933 A | * | 2/1994 | Gentes et al. | 222/525 |
| 5,836,479 A | * | 11/1998 | Klima et al. | 222/130 |

* cited by examiner

Primary Examiner—Lisa A. Douglas
(74) Attorney, Agent, or Firm—Law Offices of William L. Klima, P.L.C.

(57) ABSTRACT

Rechargeable containers and dispensers, in particular spray bottle dispensers including at least one chemical reservoir for recharging the spray bottle dispenser. Preferably, a plurality of separate chemical reservoirs containing chemical concentrate are provided within the spray bottle dispenser to fully contain any inadvertent spillage of chemicals, and to insure a high degree of safety against accidental spills, and/or accidental ingestion by children.

32 Claims, 16 Drawing Sheets

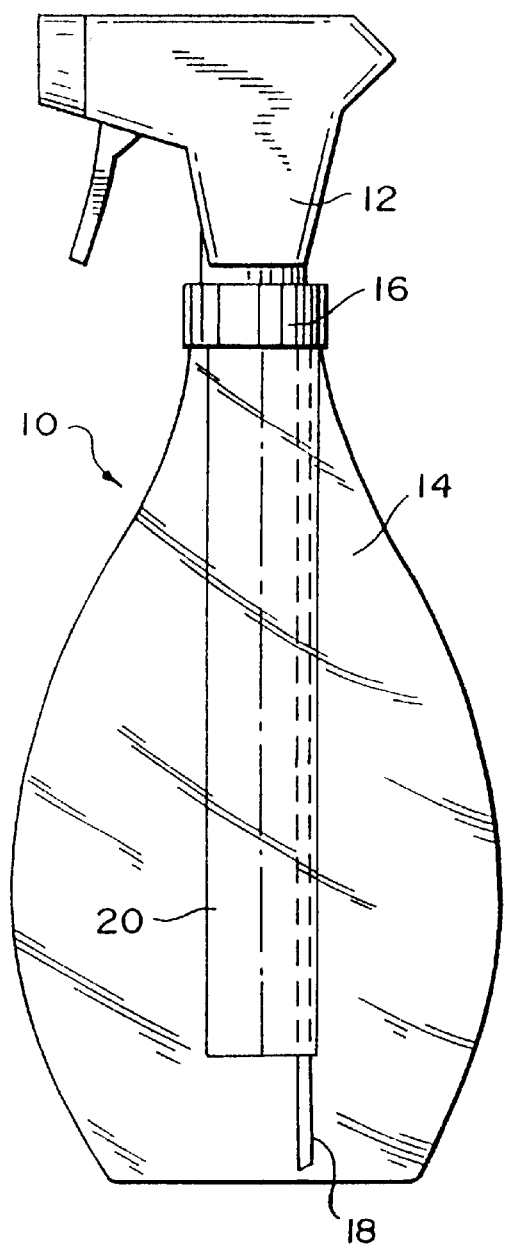
FIG. 1
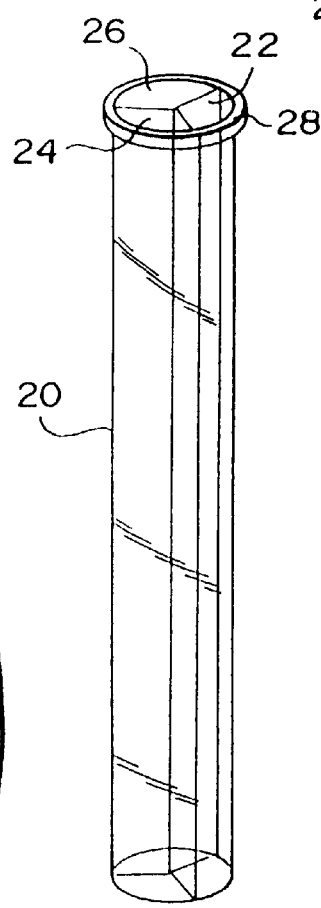
FIG. 2
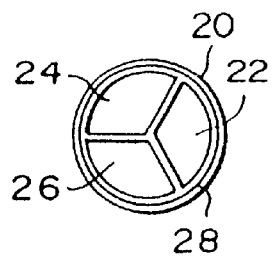
FIG. 3
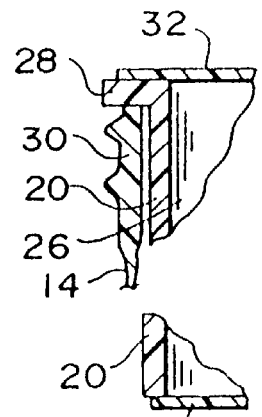
FIG. 4
FIG. 5
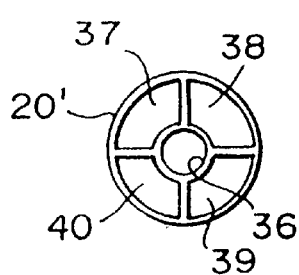
FIG. 6A
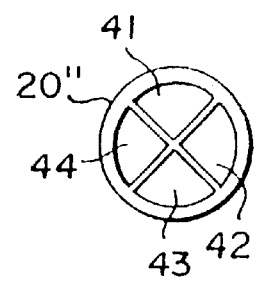
FIG. 6B

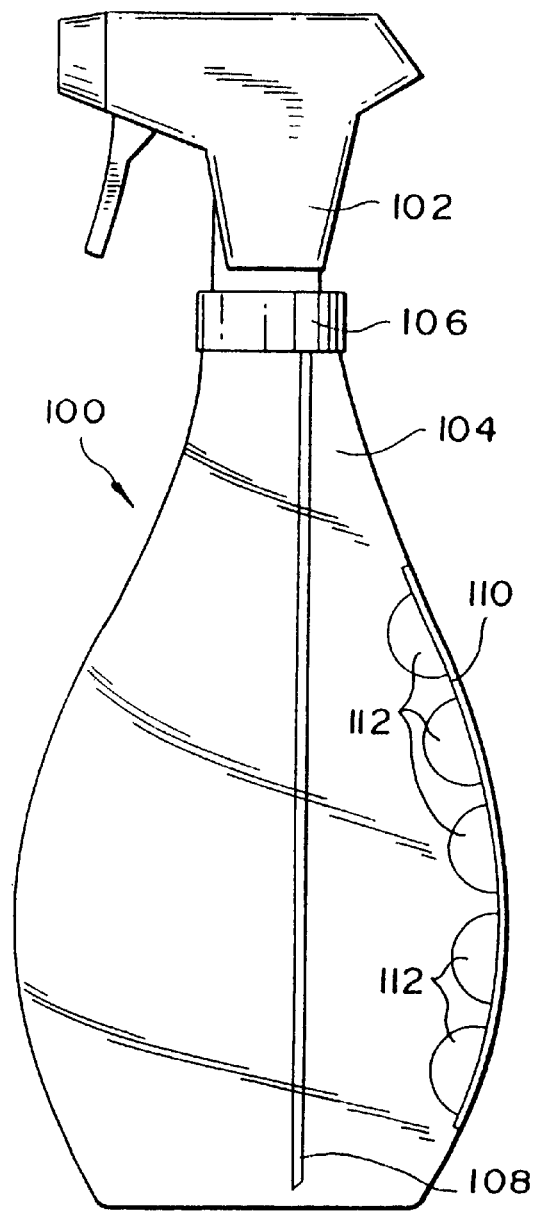
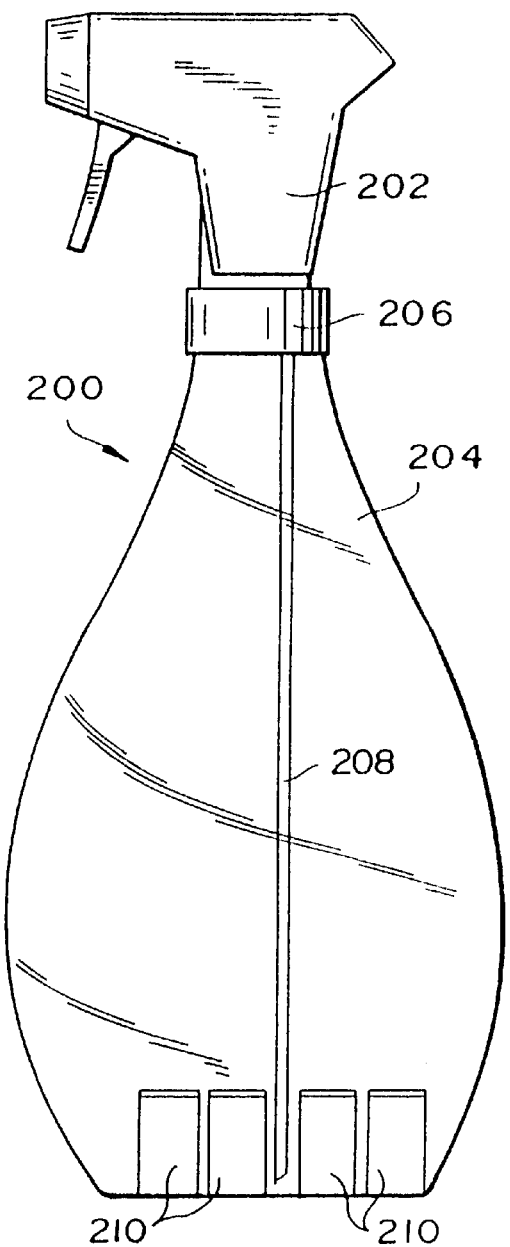
FIG. 7  FIG. 10
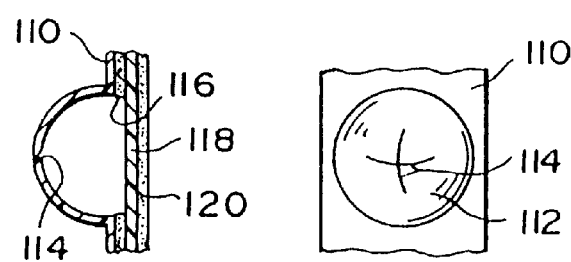
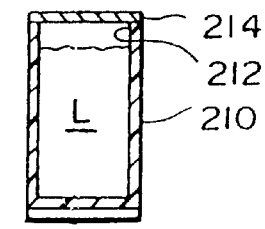
FIG. 8   FIG. 9   FIG. 11

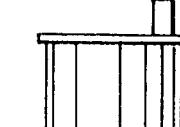
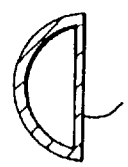
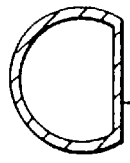
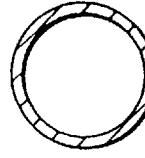
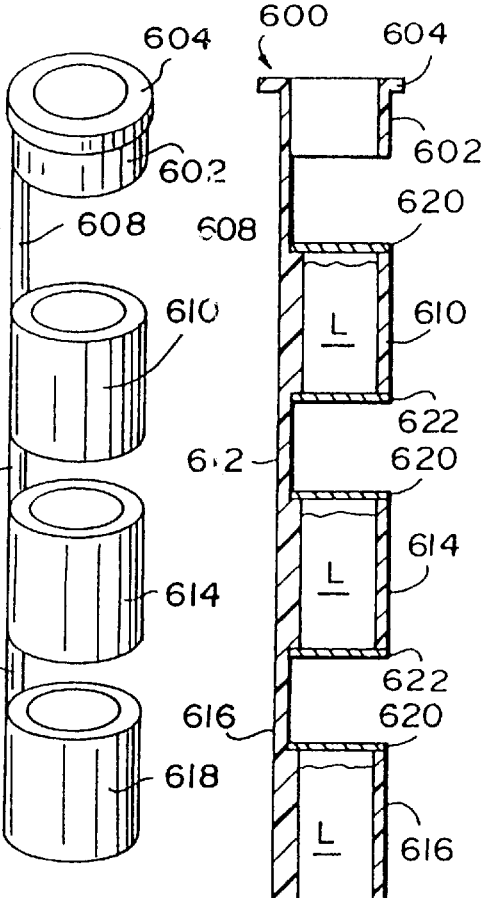
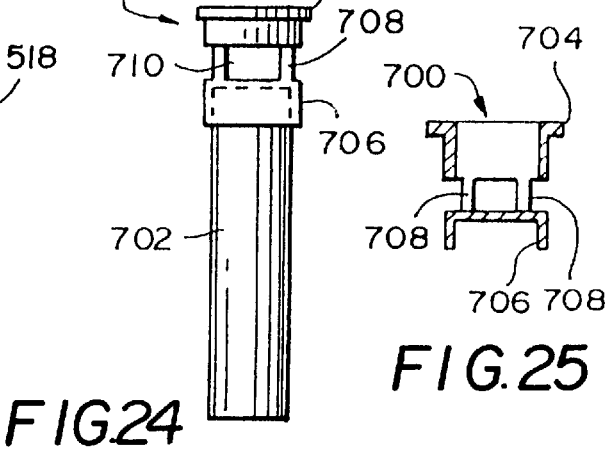

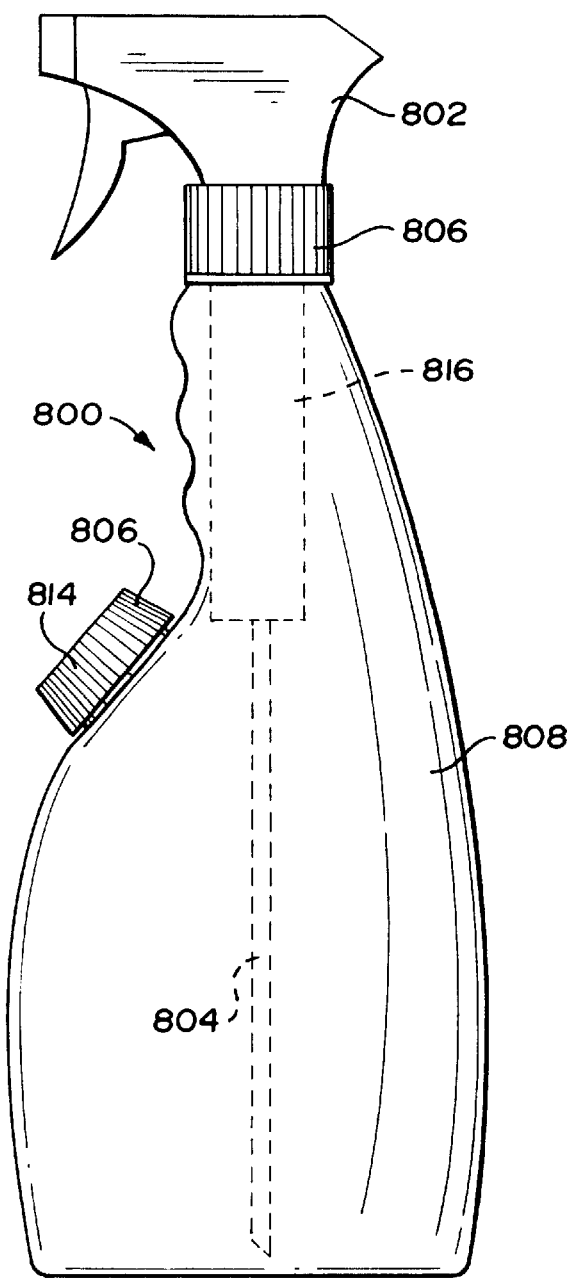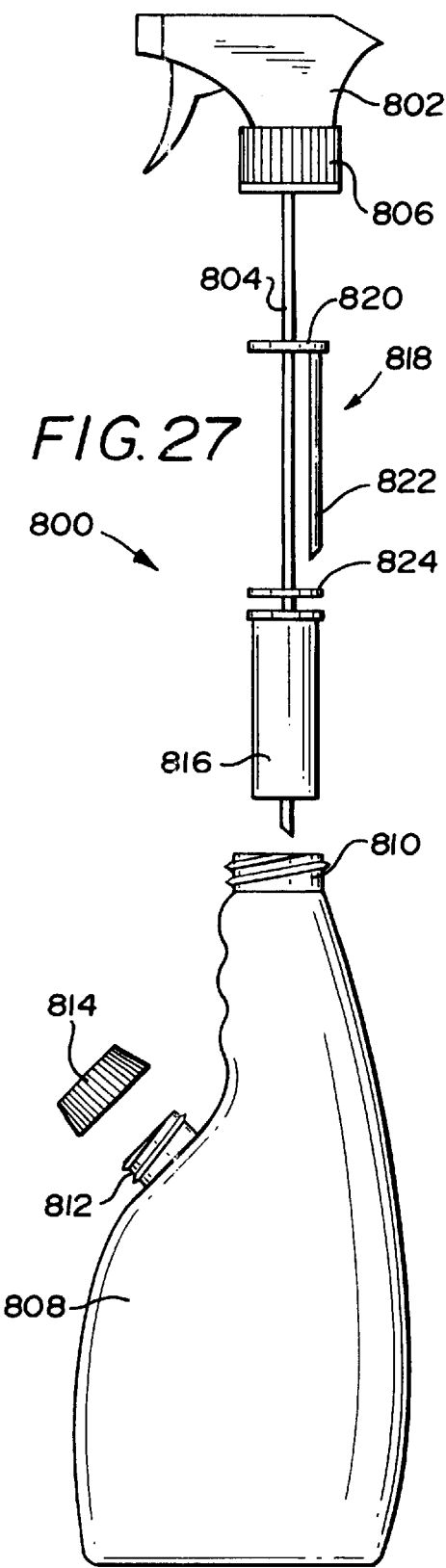

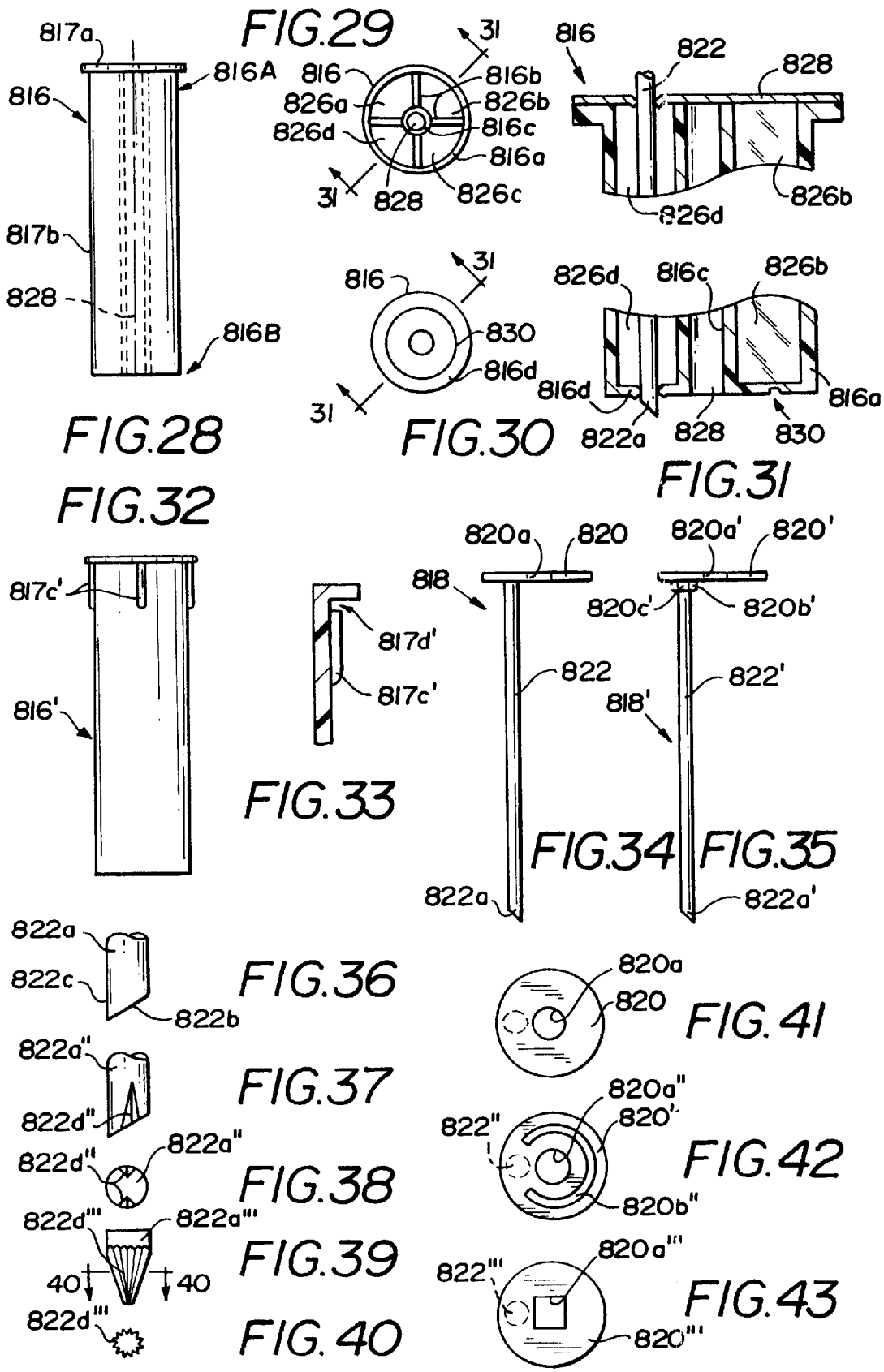

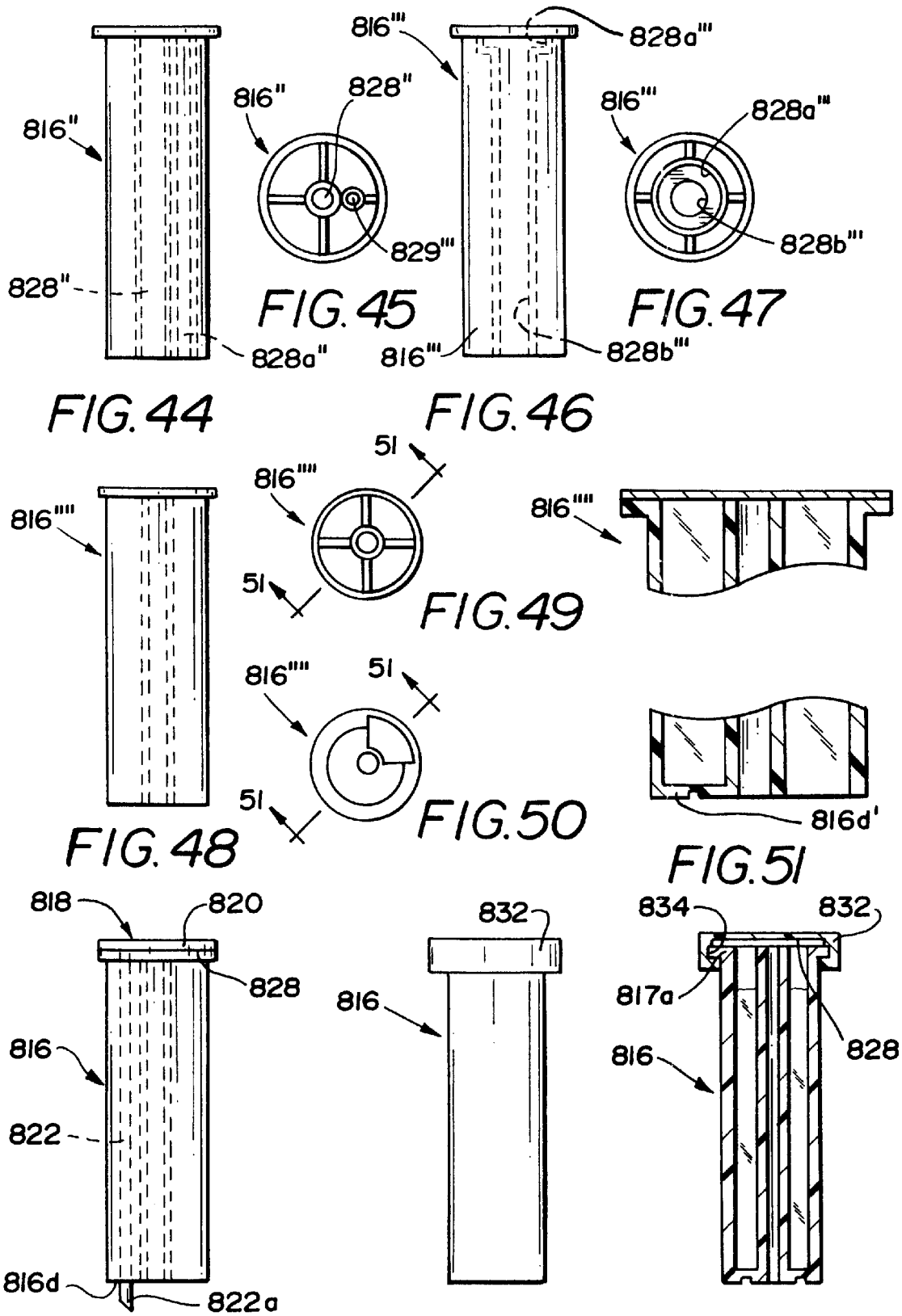

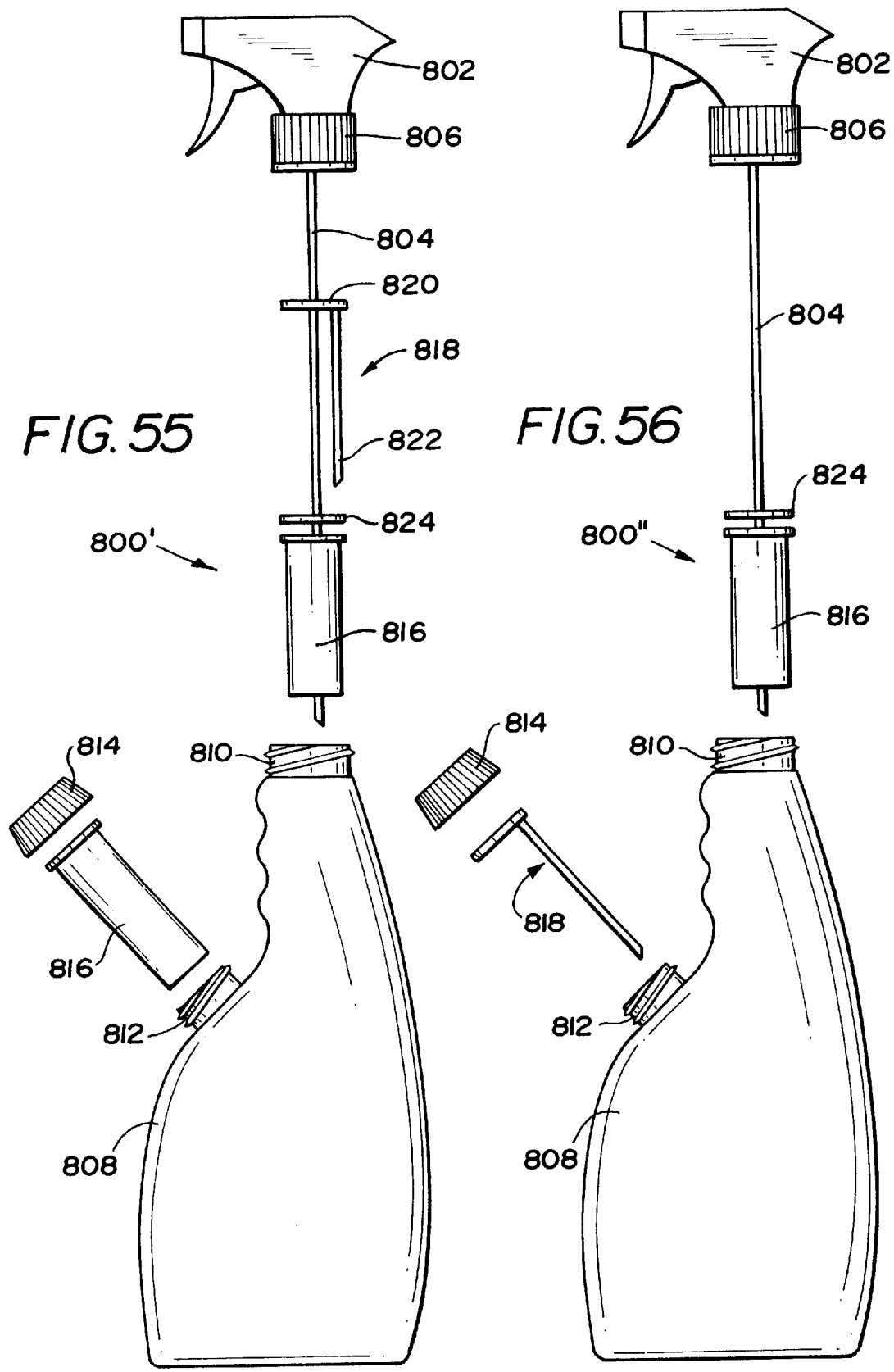

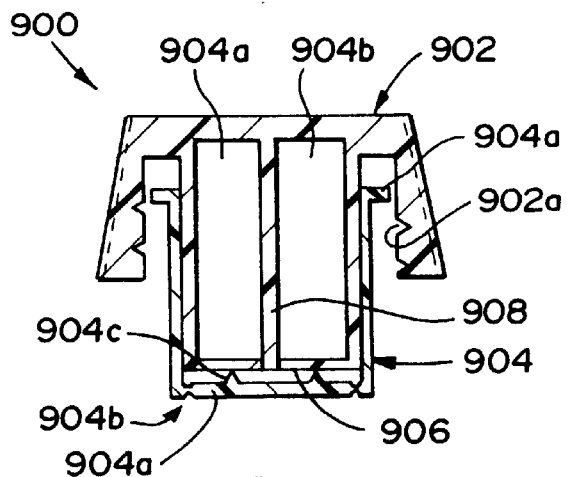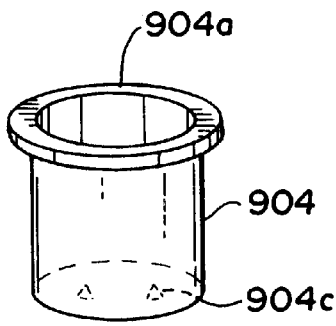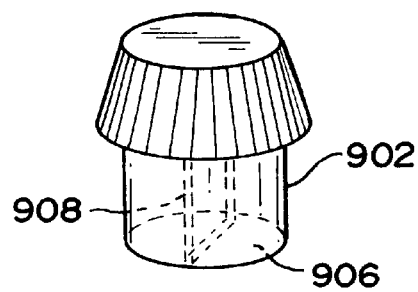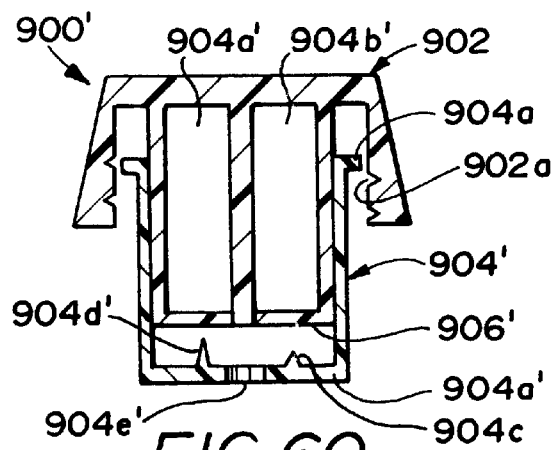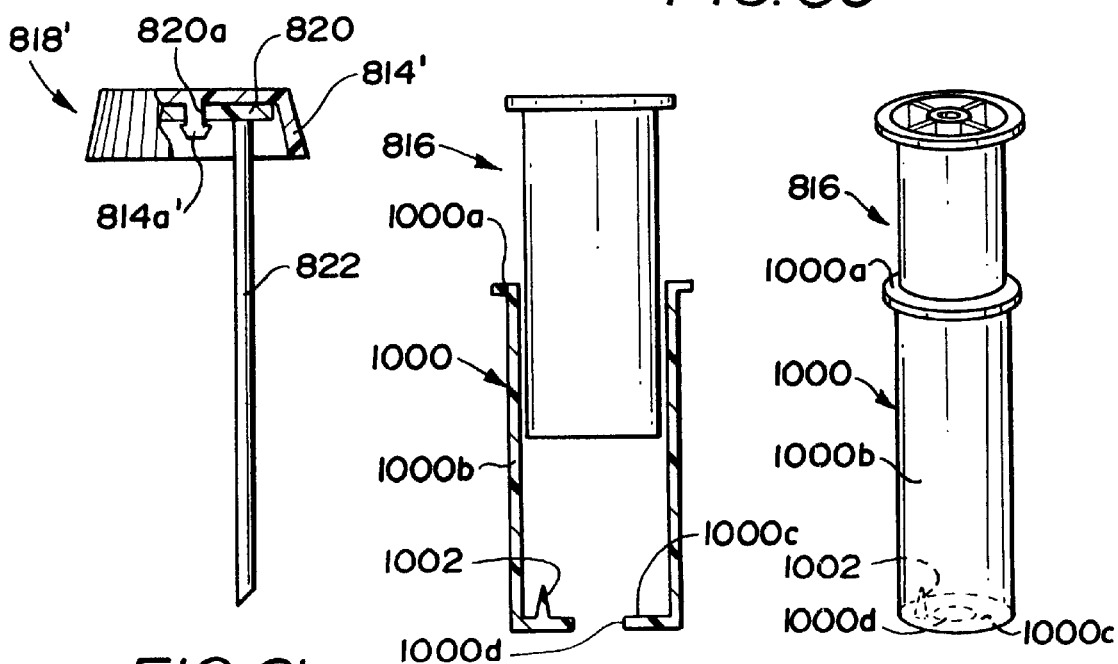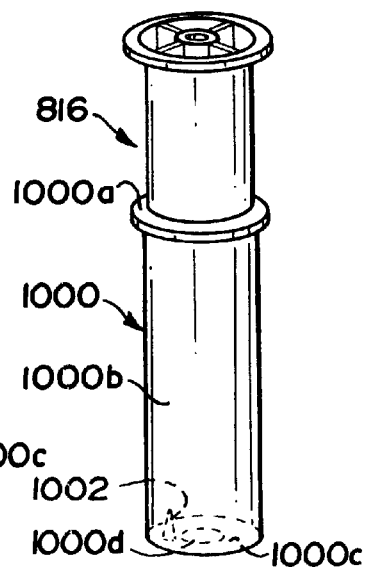

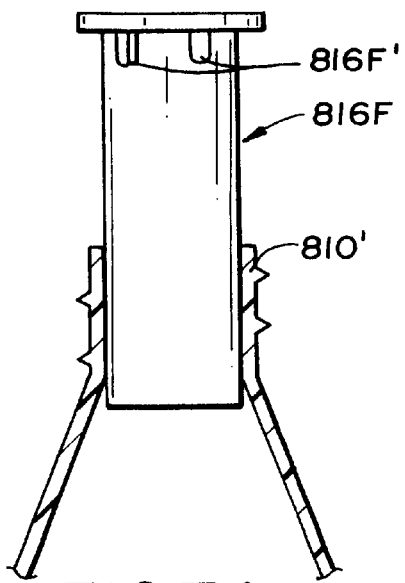
FIG.74
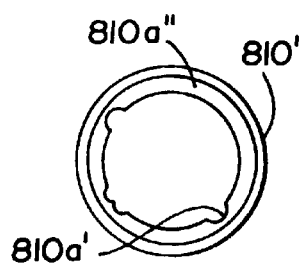
FIG.75
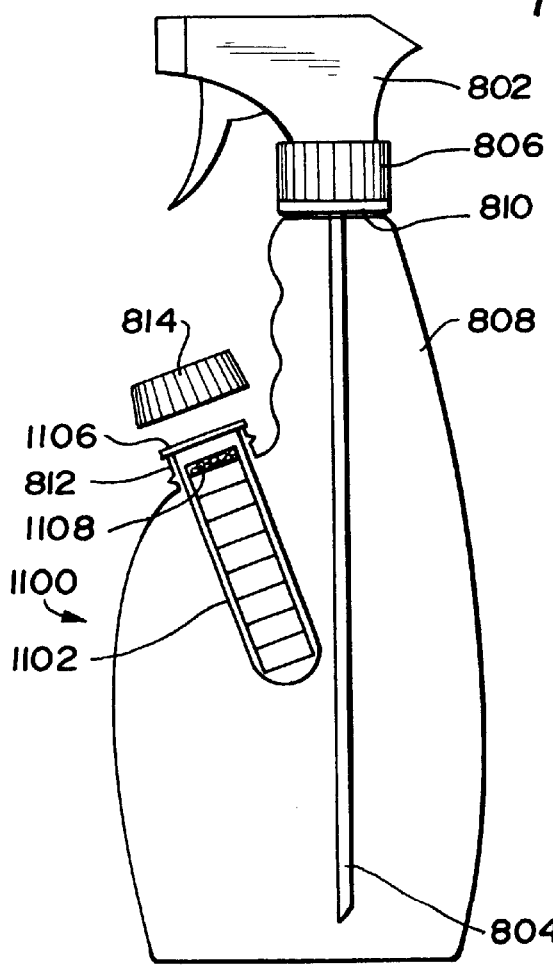
FIG.76 FIG.77
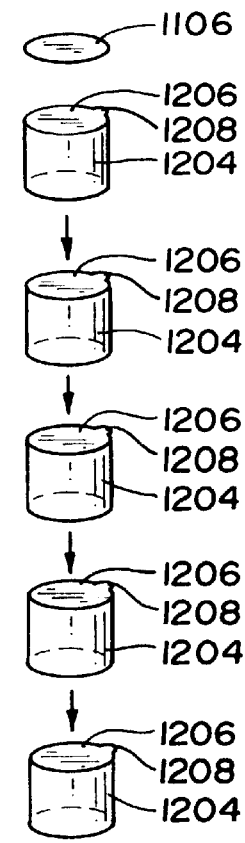
FIG.78
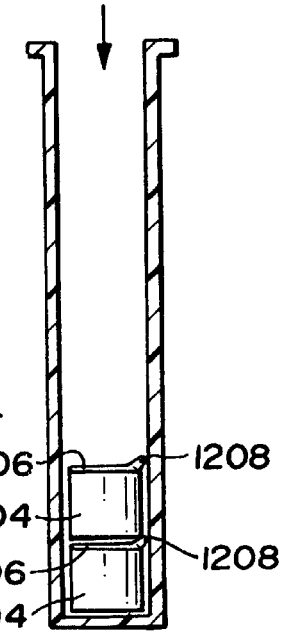

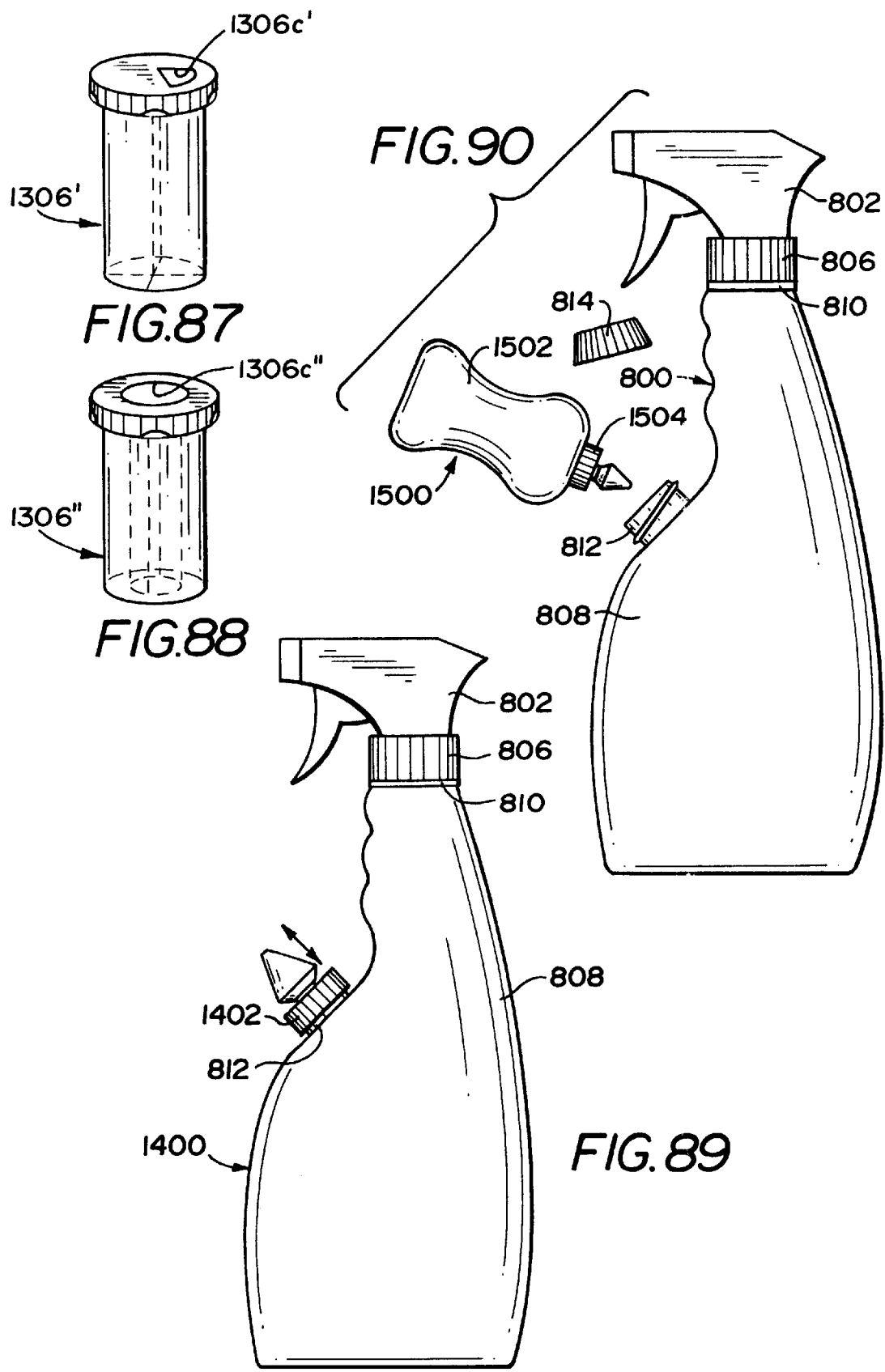

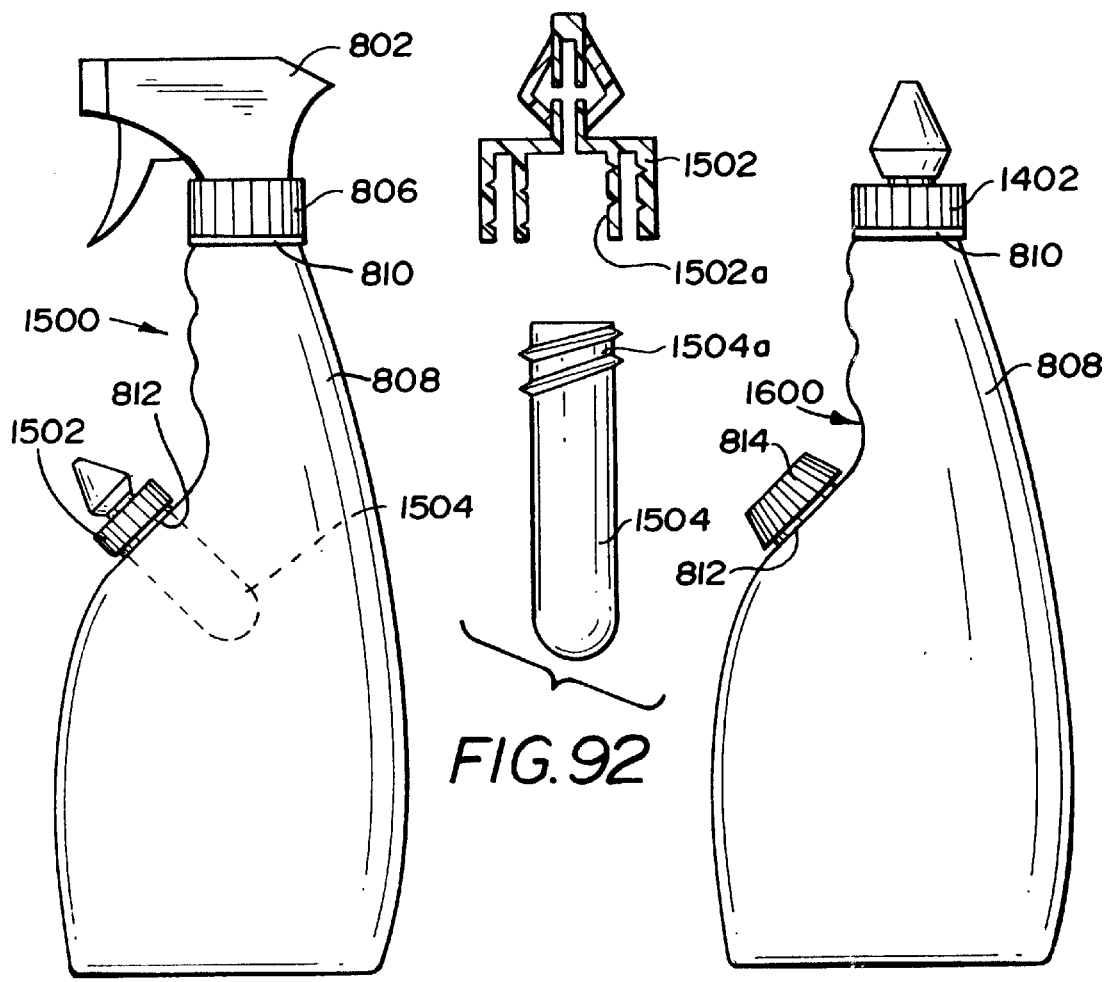
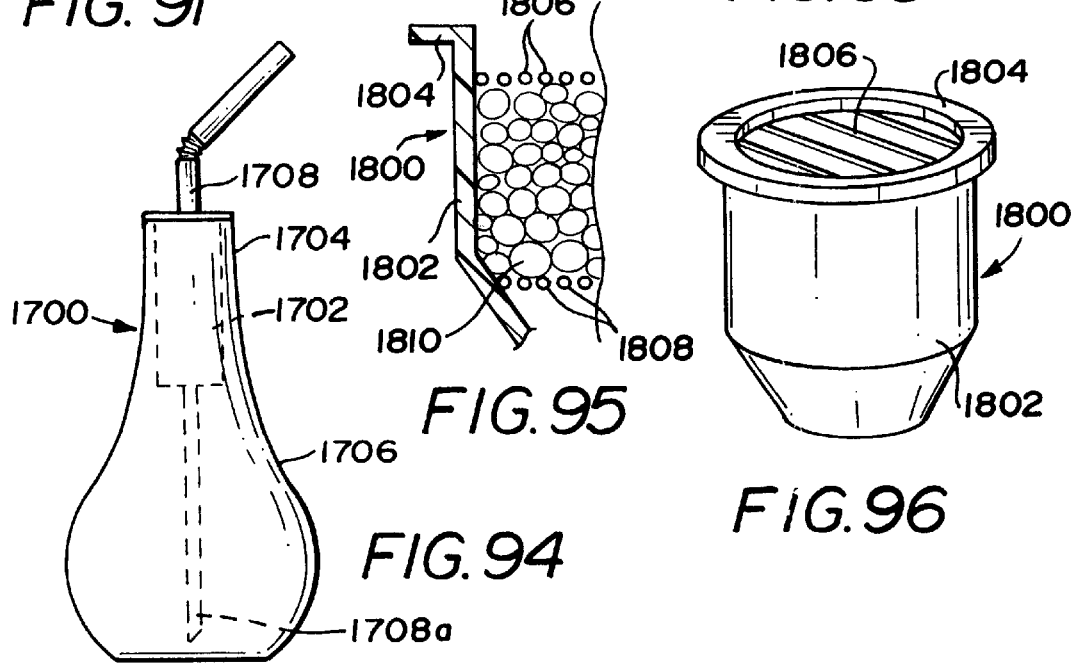

RECHARGEABLE CONTAINERS AND DISPENSERS

RELATED APPLICATIONS

This application is a continuation of U.S. application Ser. No. 08/897,838, filed Jul. 21, 1997, issued as U.S. Pat. No. 5,836,479.

This application is a continuation-in-part (CIP) of the following U.S. Patent Applications:

2) "Multiple Neck Spray Bottle, and Methods of Making and Using", Ser. No. 08/808,575, filed on Feb. 28, 1997, 3) "Recharageable Dispensers", Ser. No. 08/507,691, filed on Jul. 25, 1995 now abandoned;

4) "Recharageable Dispensers", Ser. No. 08/485,254, filed on Jun. 7, 1995 now U.S. Pat. No. 5,890,624; and 5) "Rechargeable Dispensers", Ser. No. 08/279,978, filed on Jul. 25, 1994, and issued as U.S. Pat. No. 5,529,216

These applications are all fully incorporated herein by reference.

FIELD OF THE INVENTION

This invention relates to rechargeable dispensers, in particular, rechargeable spray bottle dispensers, that can be recharged or refilled. Specifically, the present invention is particularly directed to spray bottle dispensers having one or more reservoirs containing chemical associated with the spray bottle dispensers so that the spray bottle dispensers can be recharged by simply adding water or some other suitable solvent, and accessing one or more of the chemical reservoirs to form a diluted chemical reagent.

BACKGROUND OF THE INVENTION

The use of spray bottles for dispensing chemical reagents (e.g., water, cleaners, soaps, insecticides, hair spray, etc.) are well known. Due to regulations limiting the amount of volatile organic carbons (VOC) released in the atmosphere, products originally contained and dispensed through aerosols are currently being replaced with spray bottles.

Bottlers of chemical reagents typically market their products by purchasing separately empty plastic container bottles and spray heads. The bottlers then fill, assemble, and label the completed spray bottle packages for delivery to retailers. Consumers purchase the filled spray bottles at the point-of-sale, and then use the chemical contents of the spray bottle. Most consumers dispose of the spray bottle upon the one time use of the contents of the spray bottles. However, the spray bottles are still fully functional with respect to containing and dispensing chemical reagents, since the plastic bottles are substantially chemically resistant and the spray heads remain fully functional after using the contents. Conventional point-of-sale type spray bottles can be recharged numerous times with chemical concentrate and water (i.e., at least 10 times, possibly 100 times while maintaining full operation). Thus, consumers dispose of large quantities of reusable product (i.e, empty spray bottles) having high utility value.

In today's environment of numerous regulations to control pollution, and consumer and industrial awareness for conserving resources and reducing landfill waste, it is highly desirable to promote the reuse of products that maintain their utility, and dispose of only products that no longer have any utility. Many bottlers are currently selling concentrate in various sized containers to allow consumers to recharge point-of-sale type spray bottles with their particular concentrates. However, many consumers are unwilling to adopt such methods apparently due to some inconvenience in the steps involved with the recharging process of the spray bottles. In particular, there is some inconvenience in removing the spray head, opening the chemical concentrate container, pouring the chemical concentrate into the empty spray bottle, adding water, and re-attaching the spray head to the bottle. Further, consumers apparently lack interest in recharging spray bottles due to some reluctance based on their inexperience and knowledge in mixing and diluting liquids, which is done by processing chemists for the bottlers. In addition, recharging is usually a messy undertaking due to spillage of chemical concentrate while pouring from one container to the other, overfilling, accidentally knocking over the bottle being filled due to its instability when unfilled, and other undesirable mishaps that can occur, that provide substantial inconveniences.

Importantly, sizeable containers (e.g., pint, qual, gallon, liter sizes) of chemical concentrate can be significantly hazardous to transport and handle by consumers unaware of the potent chemical properties of the chemical concentrates. Specifically, chemical spills of concentrate can damage items around the home including flooring, carpeting, counter top in kitchens and bathrooms, shelves, and other items the chemical concentrate could potentially come into contact with. Further, chemical concentrate can impose a significantly greater health risk to persons coming into accidental contact therewith potentially causing tissue burns and other damages.

Most importantly, chemical concentrate imposes a great risk to children who may accidentally ingest the chemical concentrate and become poisoned. Chemical concentrate greatly increases the chance of permanent injury or death in this regard to children versus current diluted chemical reagents contained in point-of-sale type spray bottles.

SUMMARY OF THE INVENTION

A first object of the present invention is to provide a rechargeable dispenser, in particular a spray bottle dispenser having one or more chemical concentrate reservoirs associated with the spray bottle dispenser.

A second object of the present invention is to provide a rechargeable dispenser, in particular a spray bottle dispenser having one or more chemical concentrate reservoirs disposed with the spray bottle dispenser.

A third object of the present invention is to provide a rechargeable dispenser, in particular a spray bottle having one or more chemical concentrate reservoirs disposed within the spray bottle dispenser, and accessible by bursting.

A fourth object of the present invention is to provide a rechargeable dispenser, in particular a spray bottle having one or more chemical concentrate reservoirs disposed within the spray bottle dispenser, and accessible by puncturing.

These and other objects can be achieved by the rechargeable dispenser, in particular the spray bottle dispenser according to the present invention.

The main concept according to the present invention is to provide a rechargeable dispenser, in particular a spray bottle dispenser package having at least one supply of chemical to allow the spray bottle dispenser to be recharged at least one time. The chemical can be in the form of a gas, liquid, semi-solid or solid. Specifically, the chemical liquid can be a one phase mixture, a two phase mixture, a dispersion or any other chemical reagent having liquid characteristics. The chemical semi-solid can be in the form of a slurry, paste, solid dispersed in a liquid that still exhibits some liquid type characteristics, and the solid can be in the form of a powder, granules, tablet or other solid material form.

The chemical is preferably a concentrated chemical that is readily diluted with a solvent, in particular plain water. Preferably, the chemical can be immediately diluted, however, a chemical substance that can go into solution over a 24 hour or longer period of time can potentially be suitable for some applications.

The preferred embodiments of the present invention involve associating at least one quantity of chemical with the spray bottle dispenser itself Specifically, the chemical is stored in some manner, and connected directly internally or externally to the spray bottle dispenser. However, the present invention is broader in scope to include packaging the chemical and spray bottle dispenser together (i.e., connected indirectly) to be marketed at the point-of-sale. In this embodiment of the invention, a consumer would purchase the package containing a supply of chemical and the spray bottle dispenser, separate at home the spray bottle dispenser that has been filled by the bottler from the package and store the chemical portion of the package separate from the spray bottle dispenser in the household. The user would then retrieve the stored chemical upon consuming the initial contents of the spray bottle dispenser for purposes of recharging the spray bottle dispenser.

The preferred embodiments of the invention store the at least one quantity of chemical directly or indirectly inside or outside the spray bottle dispenser. In the case of an indirect connection to the spray bottle dispenser, a mechanical fastener such as a plastic strip connects an external chemical reservoir to the spray bottle dispenser. In the case of a direct connection, the chemical reservoir is directly connected internally or externally to the spray bottle dispenser. The most preferred embodiments store the at least one quantity of chemical inside the spray bottle dispenser, particularly the bottle portion, to fully contain any inadvertent spills or leakage of chemical through the life of the spray bottle dispenser. These most preferred embodiments provide substantial advantages for handling, recharging and protecting household items from contact with chemical, and most importantly to prevent accidental ingestion by children. This particular point is especially important due to the much greater potency of chemical concentrate versus diluted chemical reagents currently being sold by bottlers at point-of-sale.

The most preferred embodiments also utilize conventional spray bottle dispenser components including plastic bottles, plastic spray heads, and plastic downtubes. In order to promote products incorporating the present invention, it is particularly important to utilize the standard components that are readily available and relatively inexpensive due to the large quantities sold and consumed. Thus, an add-on chemical reservoir for storing the chemical is highly desirable.

The most preferred add-on type chemical reservoir is an insert received within the bottle portion of the spray bottle dispenser. This type of insert can be manufactured extremely cheaply in high volume while providing all the performance characteristics necessary for a safe and reliable product. Specifically, the insert can be made with one or more chambers or cells containing chemical that can be accessed in various ways. For example, the reservoir can be sealed with membranes that can be punctured with an instrument, in particular the tip of the downtube. Alternatively, the walls of the chemical reservoir can be designed or configured so as to be readily bursted upon application of external pressure to the chemical reservoir. Adding lines of weaknesses, thinning of walls and other means for locally weakening a portion of the chemical reservoir can be implemented for use in the present invention.

Alternatively, one or more of the components of the conventional spray bottle dispenser (e.g., bottle portion, spray head portion, downtube) can be modified to provide the chemical reservoir. For example, the walls or bottom of the bottle portion can be modified, by molding a chemical reservoir in one or more sides or bottom of the bottle portion, the spray head portion can be provided with a chemical reservoir, and/or the downtube can be provided with an add-on chemical reservoir or the walls of the downtube can be molded to provide a chemical reservoir. However, all of these approaches will initially be substantially greater in cost due to the modification of conventional components not necessitated by the use of an insert according to the present invention.

The insert according to the present invention can take on many different forms and configurations. A first preferred embodiment of the insert is defined by a cylinder having one or more chambers or cells disposed therein. The interior of the cylinder can be provided with one or more bisecting walls to define the chambers along the length thereof A plastic cylinder having one or more bisecting walls can be easily extruded in plastic. The top and bottom of the one or more chambers of the insert are sealed by upper and lower sealing membranes. The membranes can be films, foils, composites of films and foils, or any other suitable composite that is both chemically resistant and subject to being punctured readily by an instrument, in particular, the tip of the downtube, or can be made to burst.

The upper and lower sealing membranes can be connected to the insert by bonding, adhesive bonding, thermal bonding, sonic welding, or suitable methods for forming a liquid tight seal (e.g., hermetic seal).

This embodiment of the insert can be marketed inside a filled spray bottle dispenser at point-of-sale. The downtube extends through an open chamber of this insert down into the lower portion of the bottle portion to access premixed chemical reagent added by the bottler during manufacture. After consumption of the chemical reagent, a user unscrews the spray head and lifts the downtube from the bottle portion. The insert is rotated so that one chemical reservoir is now positioned where the open chamber was previously positioned (i.e., now registered for being punctured by the downtube). The user then forces the tip of the downtube through the upper sealing membrane, down through the chamber, and then punctures the lower sealing membrane. Water can be added through the open chamber of the insert before or after the step of accessing the chemical reservoir by puncturing with the downtube. This configuration allows the chemical to be always stored within the confines of the spray bottle dispenser, and minimizes the steps needed for recharging the spray bottle dispenser.

The consumer will experience little inconvenience in removing the spray head and downtube from the bottle portion, rotating the insert, puncturing the chemical reservoir, adding water through the open chamber of the insert, and reassembling the spray head portion to the bottle portion. Further, the chemical concentrate stored within the insert is extremely safe for handling and preventing accidental consumption by children (i.e., a child would have to successfully unscrew the spray head portion from the bottle portion, fully remove the downtube from the bottle portion, and successfully puncture the insert). Further, even in the event of puncture of the insert by a child, the access opening through the upper sealing membrane would be sufficiently small to substantially limit spilling and containing most chemical from being easily ingested by a child. Thus, the present invention provides substantial safeguards over current methods of selling large quantities of chemical concentrate at the point-of-sale, and subsequently having the consumer handle and mix the chemical concentrate in his or her home.

This particular insert can have one, two, three, four or more separate chambers or cells. For example, in the case of four cells, one cell would be an open cell through which the downtube is initially placed by the bottler during assembly when the spray bottle dispenser is provided with an initial charge of diluted chemical. Thus, in this example, there remains three cells that can be utilized as three separate chemical reservoirs. This four cell configuration would allow the user to initially consume the premixed diluted chemical reagents of the spray bottle dispenser, and then recharge the spray bottle dispenser three more times prior to consuming all the chemical contained in the spray bottle dispenser. If the consumer then disposed of the spray bottle dispenser at that point, this would provide a three time improvement over the current practice of consumers utilizing a spray bottle dispenser one time prior to disposal. Thus, the consumption of spray bottle dispensers could be reduced three-fold (i.e., one fourth the waste) if fully implements.

However, this invention can even provide for an even greater improvement over the current practices by consumers. Specifically, this insert can also be sold at the point-of-sale as a separate item that could be added to a conventional point-of-sale type spray bottle dispensers having no inserts after the initial consumption of the contents, or for use with spray bottle dispensers having inserts according to the present invention after the complete chemical consumption of the inserts initially sold with the units.

This new system would greatly decrease the shipping weight and costs associated therewith, decrease retail shelf space for marketing the product, and most importantly greatly decrease the consumption and waste of plastic material. Specifically, the volume of plastic needed to make the four chamber insert described above would be a small fraction compared with the weight of four conventional spray bottle dispensers based on equal amounts of useable diluted chemical reagent.

Further, conventional spray bottle dispensers are substantially much greater in cost to produce relative to the insert according to the present invention, and would conserve significant labor and other direct and indirect costs associated with the production of conventional spray bottle dispenser components versus the insert according to the present invention. Further, the insert according to the present invention can readily be recycled, and could potentially be refilled if an adequate system were developed to reprocess such inserts, however, more than likely the inserts would be disposed of by consumers based on convenience factors.

A second embodiment of an insert according to the present invention involves forming a strip of chemical reservoirs that can be disposed within the bottle portion of the spray bottle dispenser. The strip of chemical reservoirs can be made at high speed, and would most likely be made in a continuous strip and cut to length when completed for insulation in each spray bottle dispenser. The strip type insert can be manufactured by a high speed molding technique such as vacuum forming the chemical reservoirs from a plastic strip, filling the chemical reservoirs with chemical, and sealing the chemical reservoirs. This completed strip is then cut to length based on the number of reservoirs to be added to the spray bottle dispenser, and is preferably attached by adhesive or other technique to the inside surface of the bottle portion. The chemical reservoirs made of the plastic strip are made in such a manner that the chemical reservoirs can be punctured by an instrument, in particular, the tip of the downtube, or can be made to,. burst by adding external pressure to the chemical reservoir. A user can burst one or more (i.e. one, two, three, etc.) of the chemical reservoirs to specifically tailor the concentration of the diluted chemical reagent. Thus, the present invention allows the consumer some latitude in selecting concentration levels currently unavailable with conventional spray bottle dispensers.

In a third embodiment, a plurality of separate cylindrical chemical reservoirs can be added to the inside of the bottom portion. The cylinder chemical reservoirs are provided with upper sealing membrane that can be punctured by an instrument, in particular the tip of the downtube. The cylinder reservoirs can be separate units or connected together by a strip, or by some other manner. The cylindrical chemical reservoirs are preferably located at the bottom wall of the bottom portion to allow easy access by the tip of the downtube during a puncturing operation.

In a fourth embodiment, cylindrical chemical reservoirs bridge the side walls of the bottle portion. The cylinder reservoirs are made so they can be burst by simply pressing together the walls at the location of the particular cylinder reservoir.

In a fifth embodiment, separate donut-shaped chemical reservoirs are added to a conventional downtube. The donut-shaped reservoirs can be made so as to be punctured or burst for chemical access. Alternatively, one or more small holes through the inner surface of the donut-shaped reservoirs can be provided and sealed by the downtube itself (adhesive can also be provided to insure adequate sealing). In this type of arrangement, the chemical inside the donut-shaped reservoir can be accessed by simply pulling the donut-shaped chemical reservoir off the downtube exposing the opening through the inner wall of the donut-shaped reservoir. The donut-shaped reservoir can be removed by unscrewing the spray head portion from the bottle portion, lifting the downtube until the lowermost donut-shaped reservoir is located at or near the opening of the bottle portion, holding the donut-shaped reservoir by the fingertips of one hand at the opening to the bottle portion, and then lifting with the other hand the downtube so as to detach the donut-shaped reservoir from the downtube, and then allowing the donut-shaped reservoir to drop into the bottle. Water is added before or after to dilute the concentrate to form the diluted chemical reagent.

In a sixth embodiment, an insert is provided with a plurality of reservoirs in a stepped and stacked array. The top reservoir is thinner and deeper compared with a bottom reservoir that is wider and shallower. One or more reservoirs having dimensions in between that of the top and bottom reservoirs can be provided therebetween. This stepped and stacked arrangement allows easy access to any of the chemical reservoirs by an instrument, in particular the tip of the downtube for puncturing a membrane sealing each reservoir.

In a seventh embodiment, a plurality of reservoirs are provided in an insert and a stacked arrangement. Each reservoir is sealed at the top and bottom with a sealing membrane. A person using a spray bottle dispenser containing this insert initially punctures the upper and lower sealing membrane of the upper reservoir during a first recharging operation, punctures the upper and lower sealing membranes of the middle reservoir to access chemical in the middle reservoir during a second recharging operation, and does the same to the third chemical reservoir in the third recharging operation.

Rechargeable Containers and Dispensers

A first object of the present invention is to provide an improved dispenser.

A second object of the present invention is to provide a rechargeable dispenser.

A third object of the present invention is to provide a dispenser configured for containing at least one charge of a substance.

A fourth object of the present invention is to provide a rechargeable dispenser configured for containing at least one charge of a substance.

A fifth object of the present invention is to provide a rechargeable dispenser configured for containing at least one charge of a concentrated substance.

A sixth object of the present invention is to provide a dispenser configured for containing multiple charges of a substance.

A seventh object of the present invention is to provide a rechargeable dispenser configured for containing multiple charges of a substance.

An eighth object of the present invention is to provide a dispenser configured for containing multiple charges of a concentrated substance.

A ninth object of the present invention is to provide a rechargeable dispenser configured for containing multiple charges of a concentrated substance.

A tenth object of the present invention is to provide a dispenser configured for containing multiple charges of the same substance.

An eleventh object of the present invention is to provide a dispenser configured for containing multiple charges of the same concentrated substance.

A twelfth object of the present invention is to provide a rechargeable dispenser configured for containing multiple charges of the same substance.

A thirteenth object of the present invention is to provide a rechargeable dispenser configured for containing multiple charges of the same concentrated substance.

A fourteenth object of the present invention is to provide a dispenser configured for containing multiple charges of different substances.

A fifteenth object of the present invention is to provide a dispenser configured for containing multiple charges of different concentrated substances.

A sixteenth object of the present invention is to provide a rechargeable dispenser configured for containing multiple charges of different substances.

A seventeenth object of the present invention is to provide a rechargeable dispenser configured for containing multiple charges of different concentrated substances.

An eighteenth object of the present invention is to provide a rechargeable dispenser configured for containing at least one charge of a substance associated with the dispenser.

A nineteenth object of the present invention is to provide a rechargeable dispenser configured for containing at least one charge of a substance associated with the dispenser and located outside the dispenser.

A twentieth object of the present invention is to provide a rechargeable dispenser configured for containing at least one charge of a substance associated with the dispenser and located inside the dispenser.

A twenty-first object of the present invention is to provide a rechargeable dispenser configured for containing at least one charge of a substance associated with the dispenser and incorporated into the dispenser.

A twenty-second object of the present invention is to provide a rechargeable dispenser configured for containing at least one charge of a concentrated substance associated with the dispenser.

A twenty-third object of the present invention is to provide a rechargeable dispenser configured for containing at least one charge of a concentrated substance associated with the dispenser and located outside the dispenser.

A twenty-fourth object of the present invention is to provide a rechargeable dispenser configured for containing at least one charge of a concentrated substance associated with the dispenser and located inside the dispenser.

A twenty-fifth object of the present invention is to provide a rechargeable dispenser configured for containing at least one charge of a concentrated substance associated with the dispenser and incorporated into the dispenser.

A twenty-sixth object of the present invention is to provide a dispenser configured for containing at least one charge of a substance stored within the dispenser.

A twenty-seventh object of the present invention is to provide a dispenser configured for containing at least one charge of a concentrated substance stored within the dispenser.

A twenty-eighth object of the present invention is to provide a dispenser configured for containing multiple charges of different reactive substances.

A twenty-ninth object of the present invention is to provide a dispenser configured for containing multiple charges of different concentrated reactive substances.

A thirtieth object of the present invention is to provide a rechargeable dispenser configured for containing multiple charges of different reactive substances.

A thirty-first object of the present invention is to provide a rechargeable dispenser configured for containing multiple charges of different concentrated reactive substances.

A thirty-second object of the present invention is to provide a dispenser or rechargeable dispenser of the combinations set forth in objects one (1) through (29) above, in combination with partial and/or full contents including a substance; same substances; different substances; concentrated substances; concentrated same substances; concentrated different substances; substance and/or concentrated substances; reactive same substances; reactive different substances; reactive same substance(s) and/or different substance(s); same substance(s) and/or reactive different substance(s); reactive same concentrate substance(s); reactive different concentrated substance(s); reactive same concentrated substance(s) and/or different substance(s); same substance(s) and/or different concentrated substance(s), and/or reactive same concentrated substance(s) and/or reactive different concentrated substance(s), and all other combination of contents or partial contents having the same and/or different concentrations, type(s) of substance, reactivity and/or non-reactivity with one or more other substances(s).

A thirty-third object of the present invention is to provide a dispenser or rechargeable dispenser of the combinations set forth in objects one (1) through thirty (30) above, including means for compromising one or more reservoirs of the dispenser or rechargeable dispenser for mixing, reacting, dissolving, liquefying, gasifying, solidifying, or otherwise bringing one or more substances together. Specifically, the means include apparatus or devices or configurations for piercing, bursting, stretching, creasing, cracking, cutting, drilling, rubbing, milling, heating, dissolving, melting, irradiating, chemically reacting, and other suitable methods and/or means.

Cartridge (Capsule)

A first object of the present invention is to provide a cartridge for containing a substance.

A second object of the present invention is to provide a cartridge for containing a concentrated substance.

A third object of the present invention is to provide a cartridge for containing multiple charges of a substance.

A fourth object of the present invention is to provide a cartridge for containing multiple charges of a concentrate substance.

A fifth object of the present invention is to provide a cartridge for containing multiple charges of the same substance.

A sixth object of the present invention is to provide a cartridge for containing multiple charges of the same concentrated substance.

A seventh object of the present invention is to provide a cartridge for containing multiple charges of different substances.

An eighth object of the present invention is to provide a cartridge for containing multiple charges of reactive substances.

A ninth object of the present invention is to provide a cartridge for containing multiple charges of different reactive substances.

A tenth object of the present invention is to provide a cartridge having multiple reservoirs for containing a substance.

An eleventh object of the present invention is to provide a cartridge having multiple reservoirs configured for containing one or more substances, which reservoirs are configured to be simultaneously opened.

A twelfth object of the present invention is to provide a cartridge having multiple reservoirs configured for containing one or more substances, which reservoirs are configured to be selectively opened.

A thirteenth object of the present invention is to provide a cartridge having multiple reservoirs configured for containing one or more substances, which reservoirs are configured to be simultaneously and/or selectively opened in one or more different modes of operation and use.

A fourteenth object of the present invention is to provide a cartridge having at least one reservoir configured for containing one or more substances, which at least one reservoir is configured to be opened at a single location.

A fifteenth object of the present invention is to provide a cartridge having at least one reservoir configured for containing one or more substances, which at least one reservoir is configured to be opened at multiple locations.

A sixteenth object of the present invention is to provide a cartridge having multiple reservoirs configured for containing one or more substances, which reservoirs are each configured to be opened at one single location and/or multiple locations.

A seventeenth object of the present invention is to provide a cartridge having at least one reservoir configured to be compromised by piercing, bursting, stretching, creasing, cracking, cutting, drilling, rubbing, milling, heating, dissolving, melting, irradiating, chemically reacting, and other suitable methods and/or means.

An eighteenth object of the present invention is to provide a plastic cartridge having the combinations set forth in objects one (1) through seventeen (17) above made by molding, injection molding, vacuum forming, drawing, casting, extruding, heating, irradiating, distorting, and/or other suitable methods of forming plastic materials.

A nineteenth object of the present invention is to provide a dispenser or rechargeable dispenser of the combinations set forth in objects one (1) through (29) above, in combination with partial and/or full contents including a substance; same substances; different substances; concentrated substances; concentrated same substances; concentrated different substances; substance and/or concentrated substances; reactive same substances; reactive different substances; reactive same substance(s) and/or different substance(s); same substance(s) and/or reactive different substance(s), reactive same concentrate substance(s); reactive different concentrated substance(s); reactive same concentrated substance(s) and/or different substance(s); same substance (s) and/or different concentrated substance(s), and/or reactive same concentrated substance(s) and/or reactive different concentrated substance(s), and all other combination of contents or partial contents having the same and/or different concentrations, type(s) of substance, reactivity and/or non-reactivity with one or more other substance(s).

The containers and dispensers according to the present invention can be utilize for thousands of various applications. For example, the dispenser according to the present invention can be utilized for dispensing chemicals, consumer cleaning chemicals (e.g. glass cleaners, surface cleaners, toilet cleaners, disinfectants), professional cleaning chemicals, soaps, reactive chemicals, health and personal care chemical products, toxic chemicals, pharmaceuticals and pharmaceutical preparations, plant chemicals and fertilizers, insecticides, solvents, paints, beverages, alcohol and non-alcohol drinks, foods for animal and/or human consumption, and all other suitable applications for dispensing a substance.

The containers and dispensers according to the present invention can be unitized with substances in various physical states including gas, liquid, solid (e.g. pills, packets), paste, slurries, unsaturated solutions, super saturated solutions, multi-phase substances, combinations of these physical states mixed, blended, reacted, dispersed, or associated in some manner), and other types of suitable physical states.

The containers and dispensers according to the present invention is particularly suitable for containing, storing, mixing, blending, reacting, dispersing, or otherwise associating one or more substances. The dispenser according to the present invention is particularly suitable for containing, storing, mixing, blending, reacting, and/or dispersing at least one concentrated substance with at least one diluent (e.g. water, solvent, premixed reagent, diluted reagent, etc.). In this manner, one or more charges of concentrate substance(s) can be diluted and dispensed from the dispenser according to the present invention. In some preferred embodiments, multiple charges of concentrated substance can be associated with the dispenser, preferably stored within the dispenser, and then simultaneously or selectively utilized to charge or recharge the dispenser.

BRIEF DESCRIPTION OF THE DRAWINGS

FIG. 1 is a side elevational view of a first preferred embodiment of the spray bottle dispenser according to the present invention.

FIG. 2 is a perspective view of the insert having three (3) separate chambers or cells defining two chemical reservoirs and an empty chamber with the insert removed from the bottle portion of the spray bottle dispenser shown in FIG. 1.

FIG. 3 is a top planer view of the insert shown in FIG. 2.

FIG. 4 is a bottom planer view of the insert shown in FIG. 2.

FIG. 5 is a partial detailed view showing the lip of the insert being supported by the mouth of the bottle portion of the spray bottle dispenser shown in FIG. 1 to suspend the insert in the bottle.

FIG. 6A is a preferred alternative insert having an empty center chamber to accept a downtube centered in the mouth of the bottle portion, and having four (4) chemical reservoirs.

FIG. 6B is a preferred alternative insert having four (4) chambers or (i.e., three chemical reservoirs and one empty chamber) cells, instead of three (3) chambers of the insert shown in FIG. 2.

FIG. 7 is a side elevational view of a second preferred embodiment of the spray bottle dispenser according to the present invention.

FIG. 8 is a partial detailed side cross-sectional view through one reservoir of the spray bottle dispenser shown in FIG. 7.

FIG. 9 is a perspective head-on view of the outer surface of the reservoir shown in FIG. 8, showing the lines of weakness in the reservoir.

FIG. 10 is a side elevational view of a third preferred embodiment of the spray bottle dispenser according to the present invention.

FIG. 11 is a side cross-sectional view of one reservoir of the spray bottle dispenser shown in FIG. 10.

FIG. 17B is a side cross-sectional view of an alternative donut-shaped reservoir.

FIG. 18 is an insert of a sixth preferred embodiment of the spray bottle dispenser according to the present invention.

FIG. 19 is a cross-sectional view of the upper reservoir of the insert as indicated in FIG. 18.

FIG. 20 is a cross-sectional view of the middle reservoir of the insert as indicated in FIG. 18.

FIG. 21 is a cross-sectional view of the lower reservoir of the insert as indicated in FIG. 18.

FIG. 22 is an insert of a sixth preferred embodiment of the spray bottle dispenser according to the present invention.

FIG. 23 is a side longitudinal cross-sectional view of the insert shown in FIG. 22.

FIG. 24 is a side elevational view of an insert with a mechanical connector according to the present invention.

FIG. 25 is a cross-sectional view of the mechanical coupler, as shown in FIG. 24.

FIG. 26 is a side elevational view of a preferred, spray bottle dispensing apparatus according to the present invention.

FIG. 27 is a break away side elevational view of the spray bottle dispensing apparatus shown in FIG. 26.

FIG. 28 is a side elevational view of a preferred insert according to the present invention.

FIG. 29 is a top planar view of the insert shown in FIG. 28.

FIG. 30 is a bottom planar view of the insert shown in FIG. 28.

FIG. 31 is a center vertical cross-sectional view of the insert shown in FIG. 28.

FIG. 32 is a side elevational view of another embodiment of an insert according to the present invention provided with outer ribs.

FIG. 33 is a partial break away cross-sectional view of a portion of a further embodiment of an insert according to the present invention.

FIG. 34 is a side elevational view of a bayonet device according to the present invention.

FIG. 35 is a side elevational view of another embodiment of a bayonet device according to the present invention.

FIG. 36 is a partial elevational view of a tip of a bayonet device according to the present invention.

FIG. 37 is a partial elevational view of another embodiment of a tip of a bayonet device according to the present invention.

FIG. 38 is a bottom planar view of the bayonet tip shown in FIG. 37.

FIG. 39 is a partial elevational view of a further embodiment of a tip of a bayonet device according to the present invention.

FIG. 40 is a bottom planar view of the plunger tip shown in FIG. 39.

FIG. 41 is a top planar view of a washer portion of a bayonet device according to the present invention.

FIG. 42 is a top planar view of another embodiment of a washer portion of a bayonet device according to the present invention.

FIG. 43 is a top planar view of a further embodiment of a washer portion of a bayonet device according to the present invention.

FIG. 44 is a side elevational view of a further embodiment of an insert according to the present invention.

FIG. 45 is a top planar view of the insert shown in FIG. 44.

FIG. 46 is a side elevational view of another further embodiment of an insert according to the present invention.

FIG. 47 is a top planar view of the insert shown in FIG. 46.

FIG. 48 is a side elevational view of an even further embodiment of an insert according to the present invention.

FIG. 49 is a top planar view of the insert shown in FIG. 48.

FIG. 50 is a bottom planar view of the insert shown in FIG. 48.

FIG. 51 is a center vertical cross-sectional view of the insert shown in FIG. 48.

FIG. 52 is a side elevational view of an insert and bayonet combination.

FIG. 53 is a side elevational view of an insert provided with a safety cap according to the present invention.

FIG. 54 is a vertical center cross-sectional view of the insert shown in FIG. 53.

FIG. 55 is a side elevational view of a spray bottle dispensing apparatus with two (2) inserts according to the present invention.

FIG. 56 is a side elevational view of a spray bottle dispensing apparatus with a bayonet device store in a second neck portion of the spray bottle.

FIG. 57 is a vertical center cross-sectional view of a cap device according to the present invention.

FIG. 58 is a perspective view of the lower cap portion of the cap device shown in FIG. 57.

FIG. 59 is a perspective view of the upper cap portion of the cap device shown in FIG. 58.

FIG. 60 is a vertical center cross-sectional view of another embodiment of a cap device according to the present invention.

FIG. 61 is a partially broken away side elevational view of a cap in combination with a bayonet device.

FIG. 62 is a partially broken away side elevational view of a cartridge and cartridge receiver having a reverse bayonet device.

FIG. 63 is a perspective view of the cartridge and cartridge receiver shown in FIG. 62.

FIG. 74 is a side elevational view of the cartridge shown in FIG. 72 and a center vertical cross-sectional view through a neck portion of a container having a keyed arrangement therebetween according to the present invention.

FIG. 75 is a top elevational view of the neck portion of a container shown in FIG. 74.

FIG. 76 is partial broken away side elevational view of a spray bottle dispenser according to the present invention with a multiple tablet cartridge dispose in the second neck portion of the spray bottle.

FIG. 77 is a center vertical cross-sectional view of the multiple tablet cartridge shown in FIG. 77.

FIG. 78 is a disassembled view of the contents of another embodiment of a cartridge having multiple individual containers.

FIG. 87 is a perspective view of another embodiment of a cartridge having a secant or quadrant shaped passageway extending therethrough to allow a diluent such a water to be poured therethrough.

FIG. 88 is a perspective view of a further embodiment of a cartridge having a center through hole extending therethrough to allow a diluent such as water to be poured therethrough.

FIG. 89 is a spray bottle dispenser according to the present invention provided with a push-pull nozzle closure on the second neck portion thereof.

FIG. 90 is a spray bottle dispenser in combination with an associated container provided with a push-pull nozzle closure according to the present invention.

FIG. 91 is a spray bottle dispenser according to the present invention provided with a container and push-pull nozzle closure provided in the second neck portion thereof.

FIG. 92 is dissembled view of the container and push-pull nozzle closure shown in FIG. 91.

FIG. 93 is a perspective view of a bottle dispenser according to the present invention provided with a push-pull nozzle closure on a first neck portion and a threaded cap on a second neck portion thereof.

FIG. 94 is a side elevational view of a beverage dispenser provided with a cartridge according to the present invention.

FIG. 95 is a partially broken away vertical cross-sectional view of another embodiment of a funnel-shaped cartridge according to the present invention having an upper screen portion and lower screen portion.

FIG. 96 is a perspective view of the funnel-shaped cartridge shown in FIG. 95.

DETAILED DESCRIPTION OF THE PREFERRED EMBODIMENTS

Definitions

Figure 12:
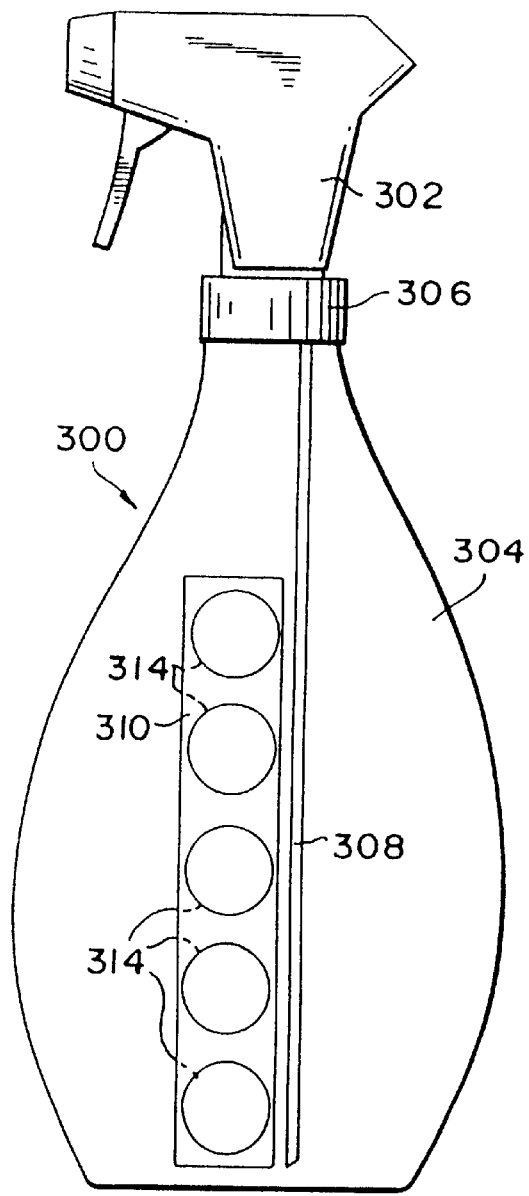
FIG. 12 is a side cross-sectional view of a fourth preferred embodiment of the spray bottle dispenser according to the present invention.

The spray bottle dispenser according to the present invention includes one or more reservoirs containing chemical or chemicals (i.e., chemical reservoirs).

The chemical reservoir can be a separate unit indirectly associated with the spray bottle dispenser by packaging, or directly associated to the spray bottle dispenser by connection to the spray bottle dispenser externally or internally. Preferred embodiments contain the one or more chemical reservoirs internally, most preferably contained inside the bottle portion to fully contain an inadvertent chemical spill or release from the one or more chemical reservoirs.

In the case of an external connection with the spray bottle dispenser, the chemical reservoir can be connected by a separate piece mechanical fastener such as a plastic tab or strip connector connecting the chemical reservoir to the bottle portion, spray head portion, or connected to both the bottle portions and spray head portions of the spray bottle dispenser.

Alternatively, the chemical reservoir can be formed as an integral portion of the bottle portion, spray head portion, and/or downtube. In the integral embodiments, the chemical reservoir can be connected by adhesive, plastic welding, plastic forming (e.g., molding), or by other means to directly integrate the reservoir into the spray bottle dispenser components.

In a preferred embodiment, the spray bottle dispenser is provided with one or more separate chemical reservoirs to allow the spray bottle dispenser to be recharged one or mor time. In a most preferred embodiments, the spray bottle dispenser is provided with one or more chemical reservoirs to allow the user to access more than one chemical reservoirs during a single recharge to increase (e.g., double, triple, quadruple, etc.) the chemical concentration of the recharging mixture in the particular recharging operation.

The chemical reservoirs can be identical units to simplify and reduce costs of manufacturing, or alternatively, can be different size, shape and/or configuration of chemical reservoirs. For example, both internally and externally connected chemical reservoirs can be applied, and/or integral and separate type chemical reservoirs can be combined.

The one or more chemical reservoirs of the spray bottle dispenser contain chemical or chemicals. Specifically, the reservoir can be filled or partially filled with only a single chemical compound, a one phase mixture of chemicals, a two phase mixture of chemicals, a dispersion, or any other liquid type chemical(s). Alternatively, the chemical(s) can be in the form of a solid such as a tablet, powder, or granules, or semi-solid such as a thick slurry. In any event, the reservoir should contain a chemical reagent that is readily diluted or dissolvable with a solvent, particularly plain water.

A preferred embodiment of a spray bottle dispenser 10 according to the present invention is shown in FIGS. 1–5. The spray bottle comprises a spray head portion 12 including an inner threaded coupler 16 threaded onto an outer threaded neck of the bottle portion 14. A downtube 18 is connected to the spray head 12 portion, and extends down into the bottom of the bottle portion 14.

The spray bottle dispenser 10 is fitted with an insert 20 having three separate chambers 22, 24 and 26. In the embodiment of the insert 20 as shown in FIG. 2, the insert is provided with a rim 28 on an upper portion of the insert 20. The rim 28 has a diameter grater than the inner diameter of the threaded neck 30 of the bottle 14, as shown in FIG. 5. Thus, the rim 28 functions to suspend the insert 20 within the bottle 14.

The chambers 22, 24 and 26 are used for storing a predetermined quantity of liquid concentrate in each chamber. The chambers 24 and 26 are sealed at the top by an upper sealing membrane 32 and the bottom of the chambers 24 and 26 are sealed by lower sealing membrane 34 as shown in FIG. 5. The chamber 22 is open (i.e., not covered by sealing membranes 32, 34) to accommodate the downtube 18, and also allow solvent such as water to be added through the insert into the bottle portion 14.

The insert 20 is preferably made of suitable plastic material, and the upper sealing membrane 32 and lower sealing membrane 34 are preferably made of suitable plastic film, metal foil, or other suitable single or composite layer. The membranes should be chemically resistant to the contents and suitable for making a liquid tight seal with the insert. The upper sealing membrane 32 and lower sealing membrane 34 can be attached to the insert 20 by various means. For example, the membranes 32 and 34 can be attached by bonding, adhesive bonding, thermal welding, sonic welding, or by any suitable conventional means for providing a liquid tight seal (e.g., hermetic seal) of the chambers 22, 24 and 26.

Various other inserts having suitable configurations can be substituted for the insert 20 shown in FIG. 1. For example, a five (5) chamber insert 20' having an open center chamber 36 and four (4) chemical chambers 37, 38, 39 and 40, is shown in FIG. 6A, and four (4) chamber insert 20" having chambers 41, 42, 43 and 44, is shown in FIG. 6. Further, the length of the insert relative to the length of the bottle 14 can be substantially varied based on different concentration levels of the concentrate utilized in the insert. Specifically, higher concentration concentrate requires less volume in the chambers of the insert, and thus reducing the needed length of the insert.

The insert 20 can be made by a variety of different techniques, however, injection molding or extruding techniques are the most suitable methods of manufacture.

The insert 20 can be marketed inside the bottle at the point-of-sale, and/or can be marketed as a separate unit that can be inserted into a conventional spray bottle.

In the case of the insert being marketed inside the bottle, all three (3) chambers 22, 24 and 26 can initially be chemical reservoirs. The bottle is filled with water or other suitable diluting liquid and the top sealing membrane 32 and bottom sealing membrane 34 sealing the chamber 22 can be punctured by the lip of the downtube 18 during insertion of the downtube into the bottle portion prior to securely fastening the spray head to the bottle portion to complete the packaging assembly.

Alternatively, the chamber 22 may be open (i.e., devoid of any liquid concentrate, as discussed above) and the bottle is initially filled with proper concentration diluted chemical reagent liquid ready to be marketed with the downtube 18 passed through the open chamber 22 during assembly. In the embodiment having three (3) chambers as shown in FIG. 3, two additional doses of concentrate contained in chambers 24 and 26 can be sequentially punctured by the consumer to dose a bottle with concentrate. The bottle 14 can be supplied with water through empty chamber 22 before or after the dosing step by the consumer.

A second embodiment of a spray bottle 100 according to the present invention as shown in FIGS. 7–9. The spray bottle 100 comprises a spray head portion 102 and a bottle portion 104. The spray head portion 102 includes a threaded coupler 106 for connecting the spray head portion 102 to a threaded neck of the bottle portion 104. A downtube 108 is connected to the spray head portion 102, and extends down to the bottom of the bottle portion 104.

In this second embodiment, a strip 110 having a plurality of chemical reservoirs 112 containing liquid concentrate is provided in the bottle portion 104. The strip 110 is attached to an inside surface of one wall of the bottle portion 104. The specific location of the strip 110 can be changed from that shown in FIG. 7 to other locations on the side and/or bottom of the bottle portion 104. Each chemical reservoir 112 is made in a manner so that is can be ruptured either by forcing the tip of the downtube 108 into the surface of the reservoir 112, or by pinching the outside walls of the bottle portion 104 together to burst one or more chemical reservoirs 112. For example, the chemical reservoir 112 can be made so that its wall has one or more lines of weakness 114, as shown in FIGS. 8 and 9.

The strip 110 is preferably made in an infinite length, and then cut to length for the particular application. Thus, different size bottles could potentially have more or less number of individual chemical reservoirs 112. Further, making the strip 112 in an infinite manner would allow for high speed production of the strip 110 for high speed insertion during bottling. In the embodiment shown in FIG. 8, the strip 110 is provided with an adhesive layer 116 connecting a sealing layer 118 to the back of the strip 110. Another adhesive layer connects the strip 110 to the wall of the bottle portion 104.

A third embodiment of a spray bottle dispenser 200 according to the present invention is shown in FIGS. 10 and 11. The spray bottle dispenser 200 comprises a spray head portion 202 and a bottle portion 204. The spray head portion 202 includes a threaded coupler 206 for connecting the spray head 202 to a threaded neck of the bottle portion 204. A downtube 208 is connected to the spray head portion 202, and extends down to the bottom portion of the bottle portion 204.

In this third embodiment, a plurality of chemical reservoirs 210 are provided at the bottom of the bottle portion 204. The chemical reservoirs 210 can be individual chemical reservoirs, or alternatively, can be connected together by mechanical coupler in some manner. In any event, the chemical reservoirs 210 must be configured in such a manner so that they can be passed through the open mouth of the bottle portion 204.

A detailed cross-sectional view of one of the chemical reservoirs 210 is shown in FIG. 11. The chemical reservoir 210 can be cylindrical or some other suitable shape with an open end 212 at a top portion thereof. The open end 212 is sealed with a metal foil 214 that can be punctured by an instrument, in particular the tip of the downtube 208. The reservoir 210 is at least partially filled with a chemical concentrate liquid L.

In use, the spray bottle dispenser 200 is filled by the bottler with diluted chemical reagent. The four (4) chemical reservoirs 210 are each at least partially filled with a chemical concentrate. Thus, this particular configuration allows for four (4) recharging operations. Each recharging operation begins with unscrewing the threaded coupler of the spray head portion 202 from the spray bottle 204, and slightly lifting the spray head portion 202 upwardly until the tip of the downtube 208 clears the upper surfaces of the reservoirs 210. The user then forces the tip of the downtube 208 through the metal foil 214 of one of the reservoirs 210 causing it to be punctured. The bottle portion 204 is filled with water either before or after the step of accessing one of the chemical reservoirs 210.

Figures 13, 14, 16, 17A:
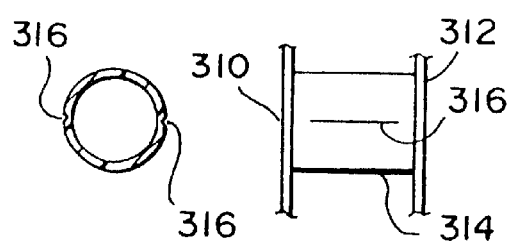
FIG. 13 is a cross-sectional view through one reservoir of the spray bottle dispenser shown in FIG. 12.
FIG. 14 is a side elevational view of the one reservoir shown in FIG. 13, showing it bridging between the sides of the bottle portion, and connected at both ends to the sides of the bottle portion.
FIG. 16 is a perspective view of one donut-shaped reservoir of the spray bottle dispenser shown in FIG. 15.
FIG. 17A is a side cross-sectional view of the donut-shaped reservoir shown in FIG. 16.

A fourth embodiment of a spray bottle dispenser 300 according to the present invention is shown in FIGS. 12 to 14. The spray bottle dispenser 300 comprises a spray head portion 302 and a bottle portion 304. The spray head portion 302 includes a threaded coupler 306 for connecting the spray head portion 302 to a threaded neck of the bottle portion 304. A downtube 308 is connected to the spray head portion 302, and extends down to the bottom portion of the bottle portion 304.

In this fourth embodiment, strips 310 and 312 connect together a plurality of chemical reservoirs 314. Five (5) reservoirs are shown in FIG. 12, however, either more or less reservoirs can be utilized.

The reservoir 314 is provided with lines of weakness 316 as shown in FIGS. 13 and 14. The lines of weakness allow the reservoir 314 to burst upon application of force to the reservoir 14. For example, the sides of the bottle portion 304 can be squeezed at the location of one of the chemical reservoirs 314 causing it to burst.

The strips 310 and 312 are preferably secured to the walls of the bottle portion 304. For example, the strips 310 and 312 can be adhered with adhesive, or connected by sonic welding or thermal welding. The strip 310 and chemical reservoirs can be molded from plastic.

In this particular embodiment, the spray bottle dispenser 300 is recharged by bursting one or more of the reservoirs 314. The more reservoirs 314 that are burst, the stronger in concentration the resulting diluted chemical reagent will be. A solvent such as water can be added before or after the bursting operation. The spray bottle dispensers are preferably filled with diluted chemical reagent by the bottler containing the plurality of reservoirs 314 to allow numerous recharging operations.

Figure 15:
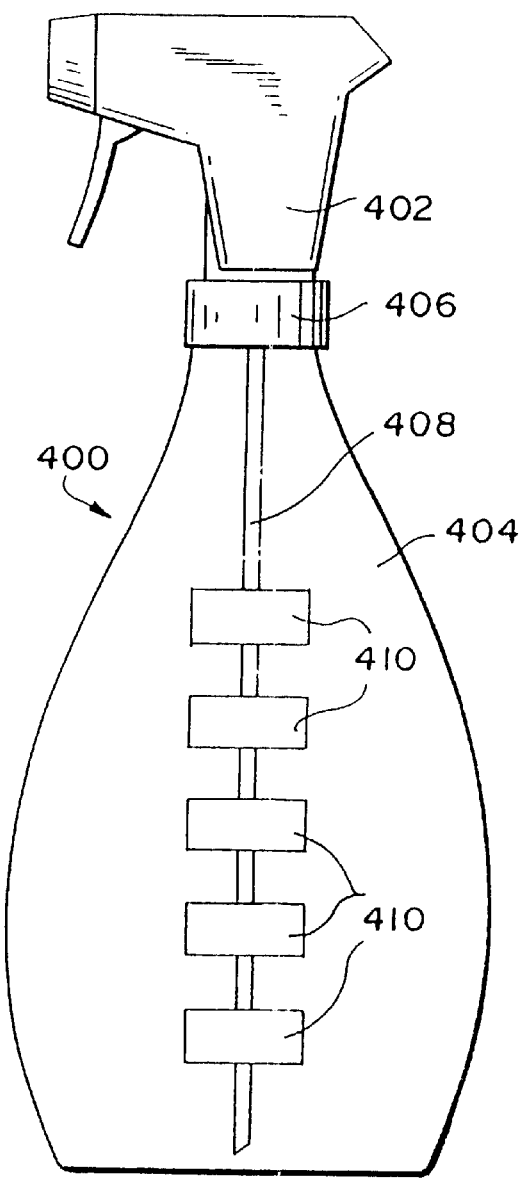
FIG. 15 is a side elevational view of the fifth preferred embodiment of the spray bottle dispenser according to the present invention.

A fifth embodiment of a spray bottle dispenser 400 according to the present invention is shown in FIGS. 15 to 17. The spray bottle dispenser 400 comprises a spray head portion 402 and a bottle portion 404. The spray head portion 402 includes a threaded coupler 406 for connecting the spray head portion 402 to a threaded neck of the bottle portion 404. A downtube 408 is connected to the spray head portion 402, and extends down to the bottom portion of the bottle portion 404.

In this fifth embodiment, a plurality of donut-shaped chemical reservoirs 410 are provided on the downtube 408. Specifically, the donut-shaped chemical reservoirs 410 each have a center hole 412 through which the downtube 408 passes. The chemical reservoirs 410 are provided with a metal foil 414 for sealing an upper end of the chemical reservoir 410 for containing the chemical reagent liquid L, as shown in FIGS. 16 and 17.

In use, the spray bottle dispenser 400 is initially filled by the bottler with dilute chemical reagent and sold at the point-of-sale. After the initial consumption of the diluted chemical reagent, a user unscrews the spray head portion 402 from the body portion 404 and lifts the downtube 408 from the bottle portion 404. The user then grips the lowermost reservoir 410 and simply pulls it off the end of the downtube 408, and then punctures the metal foil 414 with an instrument, in particular the tip of the downtube 408. The punctured reservoir 410 is dropped into the bottle portion 410. A solvent such as water is added to the bottle portion 404 before or after the step of puncturing the reservoir 410. The spray bottle dispenser 400 is then reassembled by screwing the spray head portion 402 onto the bottle portion 404.

Another embodiment of a donut-shaped chemical reservoir 410' is shown in FIG. 17B. This chemical reservoir 410', is sealed at the top to define an annular chamber 416 containing the chemical concentrate liquid L. One or more small holes 418 are provided on the internal wall of the through hole 412' to allow chemical to escape therethrough. The hole 418 is sealed by the outer surface of the downtube when the downtube is inserted through the center hole 118. Further, a thin layer of adhesive or sealant can be applied between the donut-shaped reservoir and the downtube to further ensure sealing of the hole 418.

A sixth embodiment of a spray bottle dispenser utilizes insert 500 as shown in FIGS. 18 to 21. The insert 500 comprises a cylinder portion 502 having a lip portion 504, a connector portion 506 connecting the cylinder portion 502 to an upper reservoir 508, a connector portion 510 connecting the upper reservoir 508 to a middle reservoir 512, and a connector portion 514 connecting the middle reservoir 512 to the lower reservoir 516. A downtube 518 is shown passing through the hollow cylinder portion 502, however, is not connected to the insert 500.

The reservoirs 508, 512 and 516 are in a stacked and stepped arrangement. The upper reservoir 508 is thinner in width and deeper in depth compared with the lower reservoir 516. The middle reservoir 512 has dimensions between those of the upper reservoir 508 and lower reservoir 516. This stepped and stacked arrangement allows access by an instrument to puncture sealing membranes (not shown) sealing each reservoir 508, 512, 516 while the insert remains in the bottle portion of the spray bottle dispenser.

A seventh embodiment of a spray bottle dispenser having an insert 600 is shown in FIGS. 22 and 23. The insert 600 comprises a cylindrical portion 602 having a lip portion 604, a connector portion 608 connecting the cylindrical portion 602 to upper reservoir 610, a connector portion 612 connecting the upper reservoir 610 to middle reservoir 614, and a connector portion 616 connecting the middle reservoir 615 to lower reservoir 618. The top and bottom of each reservoir 610, 614 and 128 are open, and each sealed by upper metal foil 620 and a lower metal foil 622.

In use, the spray bottle dispensers are filled with diluted chemical reagent initially by the bottler, and the downtube is passed only through the cylinder portion 602. After consumption of the initial diluted chemical reagent, the user withdraws the downtube above the level of the upper reservoir 612, and forces the tip of the downtube through the upper metal foil 520 and lower metal foil 622 of the reservoir 510 releasing the chemical concentrate liquid into the bottle portion. A solvent such as water is added before or after the step of accessing the chemical concentrate liquid. After puncturing the metal foil 520 and 622, the downtube is lifted upwardly and then passed between the cylinder portion 602 and the side of the reservoir 610. Alternatively, the downtube can be threaded through the reservoir 610 and down along the side of the middle reservoir 614 so as not to puncture the chemical reservoir 614. The connector portion 608, 612 and 616 are substantially flexible enough to act as hinges to move the lower reservoirs out of the way so as not to be punctured by the downtube during the insertion operation of the downtube.

In an alternative embodiment, only the upper portion of each reservoir is provided with a membrane that can be punctured with the bottoms being molded portions of the reservoirs, and not readily subject to being punctured.

In an eighth embodiment, a mechanical coupler 700 is connected to an insert 702. The insert 702 is identical to the insert shown in FIG. 2, however, with no lip portion 28. The mechanical coupler includes a lip portion 704 and a connector portion 706 connected together by four (4) standoffs 708 (only two are shown in FIGS. 24 and 25). The connector portion 706 is connected to an upper portion of the insert 702, by interference fit, adhesive, sonic welding, thermal welding, or by other suitable connection means.

This arrangement provides four (4) portion 710 to allow water poured through the center of the mechanical coupler 700 to pass through and out the ports 710 into the bottle portion when recharging the spray bottle dispenser with this arrangement.

This arrangement allows the insert 702 to be extruded continuously, since no lip need be molded in the insert 702. The insert 702 is provided with upper and lower sealing membranes (not shown) and then attached to the mechanical coupler 700 during assembly. Thus, the insert 702 can be cut from a continuous length of material extruded at high speed, filled with chemical concentrate, sealed with the sealing membranes at both ends, and then assembled with the mechanical coupler 700 to finish complete assembly.

Two-neck Spray Bottle Dispenser

A preferred spray bottle dispenser 800 is shown in FIGS. 26 and 27. The spray bottle dispenser 800 includes a spray head 802, a downtube 804 and an internally threaded coupler 806. The spay bottle dispenser 800 also includes a two-neck spray bottle 808 including a first externally threaded neck portion 810 cooperating with the internally threaded coupler 806 of the spray head 802, and a second externally threaded neck portion 812 cooperating with an internally threaded cap 814.

An insert 816 disposed within the assembled spray bottle dispenser 800, as shown in FIG. 26. The insert 816 is the same or similar to the insert 20, 20' and 20" shown in FIGS. 1–6B. Specifically, the insert includes at least one reservoir for containing chemical concentrate, preferably, the insert includes multiple reservoirs containing chemical concentrate. A bayonet device 818 including a washer 820 and bayonet 822 is provided on the downtube 804, as shown in FIG. 27. Specifically, the washer 820 is provided with a through hole for accommodating the downtube 804. An additional washer 824, for example, made of foam material is optionally provided between the bayonet device 818 and the insert 816.

The bayonet device 818, washer 824 and insert 816 are all slidable along the downtube 804 to allow assembly of the spray bottle dispenser 800. Preferably, the through hole in the washer 820 is held fairly tightly (e.g., slight interference fit) on the downtube 804 so that it can be positioned at an upper portion of the downtube 804, and will not slip easily from this position once assembled. The through holes in the washer 824 and insert 816 can be slightly oversized to facilitate easy assembly and venting of air from the spray head 802 into the spray bottle 808.

The spray bottle dispenser 800 is assembled by inserting the downtube 804 into the spray head 802, and then sliding in the bayonet device 818, washer 824 and insert 816 onto the downtube 804. This subassembly shown in FIG. 27, is then loaded into the spray bottle 808 through the first neck portion 810. Alternatively, the insert 816 can be first disposed in the first neck portion 810 of the spray bottle 808 and then the subassembly including the spray head 802, downtube 804, bayonet device 818 and washer 824 may be loaded into the spray bottle 808 by feeding the tip of the downtube 804 through the through hole in the insert 816. Then, the threaded coupler 806 of the spray head 802 is rotated to connect with the externally threaded first neck portion 810 of the spray bottle 808. The cap 814 can be connected to the externally threaded second neck portion 812 before or after the subassembly is connected to the spray bottle 808.

The details of the insert 816 are shown in FIG. 28–31. The insert is provided with four (4) reservoirs 826a, 826b, 826c,

826d. The insert 816 is also provided with a through hole 828 (e.g., centered or off-centered depending on spray head design) to accommodate the downtube 804 of the spray head 802, as shown in FIGS. 26 and 27.

The reservoirs 826a, 826b, 826c, 826d, are defined by different wall portions of the insert 816. Specifically, the insert 816 includes an outer cylindrical portion 816a divided into four (4) sections by ribs 816b connecting to an inner cylindrical portion 816c.

The upper ends of the reservoirs 826a, 826b, 826c, 826d are open while the lower ends of the reservoirs are closed by a bottom wall portion 816d, as shown in FIG. 30. The insert 816 is preferably made by injection molding a plastic material (e.g., polyethylene, polypropylene, polyvinyl chloride, PETE, etc.).

The upper ends of the reservoirs 826a, 826b, 826c, 826d are sealed by a sealing membrane 828, as shown in FIG. 31. The membrane, for example, can be a metal foil, polymer film, composite polymer film, composite film of foils and/or films, or other suitable sealing membranes. The membrane 828 can be applied by adhesive, thermal welding, inductive welding, ultrasonic welding, or other suitable methods. It has been found that the use of a cap seal is particularly suitable utilizing inductive heating or welding to ensure a long lasting airtight seal. Alternatively, a foil and/or film can be inductively heated and sealed without a backing layer of a cap seal.

The bottom of each reservoir 826a, 826b, 826c, 826d are formed closed, and are defined by bottom wall portion 816d integrally molded as part of the insert 816, as shown in FIG. 31. The bottom wall 816d is configured so as to be breakable by the tip of the bayonet 822. For example, a circular groove can be molded in the bottom wall portion 816d as shown in FIGS. 30 and 31. The circular groove reduces the thickness of the bottom wall portion 816d between the outer cylindrical wall portion 816a and inner cylindrical wall portion 816c. In the embodiment shown in FIG. 31, the circular groove 830 is located approximately midpoint between the outer cylindrical wall portion 816a and inner cylindrical wall portion 816c, which corresponds to a position where the tip of the bayonet 822 engages during a process of rupturing or puncturing the bottom wall portion 816d of one of the reservoirs 826a, 826b, 826c, 826d. The rupturing of the bottom wall portion 816d of one of the reservoirs 826a, 826b, 826c, 826d, releases chemical concentrate stored in that particular reservoir of the insert 816 into the spray bottle 808.

The insert 816 shown in FIG. 28 is provided with an upper flange portion 817a to allow the insert 816 to be suspended in the first neck portion 810 of the spray bottle 808 shown in FIG. 27. The body portion 817b is provided with an outer diameter such that it can be inserted within the first neck portion 810 of the spray bottle 808. Specifically, the outer diameter of the body portion 817b can be slightly oversized, the same size, or undersized relative to the inner diameter of the circular opening of the first neck portion 810. In the situation of the diameter of the insert 816 being slightly oversized, an interference fit is provided to retain the insert 816 within the first neck portion 810 to an extent requiring some force to be applied to the insert in order to retrieve the insert 816 from the first neck portion 810 at a later time. Alternatively, in the situation of the outer diameter of the insert 816 being the same or undersized relative to the inner diameter of the first neck portion 810, the insert 816 can be freely inserted and removed with little or no resistance. In some applications, it is desirable that the insert 816 is freely insertable and removable to allow another insert to be reloaded into the first neck portion 810 of the spray bottle 808 to maximize reuse of the spray bottle dispenser 800. In other applications, it is desirable that the insert, once inserted into the first neck portion 810 of the spray bottle 808 is substantially not removable precluding reuse of the spray bottle dispenser 800 (e.g., chemical concentrate that is highly toxic or corrosive such as insecticides, strongly acidic, strongly basic, organic solvents, toxic additives).

In the alternative embodiment shown in FIG. 32, the insert 816' is provided with ribs 817c' to purposely create an interference fit between the insert 816' and the first neck portion 810 of the spray bottle 808 at the location of the ribs 817c', The ribs 817c' make the insert 816' more difficult (i.e., requires additional force) to retrieve from the first neck portion 810 of the spray bottle 808, once inserted into the first neck portion 810. However, in this embodiment, the insert 816' can still be removed from the first neck portion 810, but may require a tool (e.g., a fingernail) to pry the insert from the spray bottle 808. In a further embodiment shown in FIG. 33, the ribs can each be provided with a notch 817d' which allows the rib 817c' to act as a hook or barb to substantially retain the insert within the first neck portion 810 of the spray bottle 808 making it substantially not removable. Further, the first neck portion 810 of the spray bottle 808 can be provided with a slightly inwardly extending flange, which would be accommodated within the notch 817d' of the rib 817c' providing an interlocking fit again to make the insert substantially not removable from the first neck portion 810 of the spray bottle 808.

An embodiment of the bayonet device 818 is shown in FIG. 34. In this embodiment, the bayonet device 818 is made as a one-piece unit, for example, by injection molding of plastic material. The bayonet device 818 includes a washer 820 provided with a through hole 820a for accommodating the downtube 804 of the spray head 802 (FIG. 27) with an integrally molded bayonet 822 extending downwardly therefrom. The bayonet 822 is provided with a tip portion 822a having a beveled end that is somewhat sharpened to facilitate rupturing of the bottom wall portion of a reservoir of the insert 816. Specifically, the sharpened tip provides a point force to facilitate rupturing of the bottom wall portion 816d at the weakened position of the wall portion 816d located at the circular groove 830.

In an alternate embodiment shown in FIG. 35, the bayonet device 818' is made as a two-piece unit wherein the washer 820' is a separate unit from the bayonet portion 822'. In this embodiment, the washer 820' is provided with a flange 820b' having a hole 820c' for accommodating an upper end of the bayonet portion 822'. For example, the pieces can be assembled by an interference fit, adhesive, thermal welding, inductive welding, or by some other suitable method of connection to ensure that the bayonet device once assembled will remain preferably permanently assembled.

In this embodiment, the washer portion 820' can be made of different material from the bayonet portion 822', for example, the washer portion 820' can be made of injection molded plastic material while the bayonet portion 822' can be made of a composite fiberglass material to provide additional strength and sharpness of the tip 822a'. Alternatively, the bayonet portion 822' can be made from extruded plastic material. In the situation of the bayonet portion 822' being extruded, the entire length of the bayonet portion 822' can be fluted or serrated to provide a plurality of peripheral grooves along the length thereof to facilitate drainage of chemical concentrate (i.e., prevent sealing) between the tip 822a' and the bottom wall portion 816d of one of the reservoirs 826a, 826b, 826c, 826d.

Various tip designs of the bayonet 822 are shown in FIGS. 36–40. In the embodiment shown in FIG. 36, the tip 822a is provided with a beveled end 822b providing a sharpened tip 822c. The outer surface of the bayonet 822a is substantially smooth. In another embodiment shown in FIG. 37, the tip 822a" is provided with a pair of opposite flutes or grooves 822d" to facilitate the drainage of chemical concentrate between the tip and the bottom wall 816d of the insert. Specifically, the flutes 822d" provide fluid passageways for the chemical concentrate to drain even when the tip 822a" is fully surrounded by the ruptured bottom wall portion 816d of the insert 816. In a further embodiment shown in FIGS. 39 and 40, the tip 822a'" is fluted or grooved around its entire periphery to provide multiple fluid passageways for chemical concentrate to drain from a ruptured reservoir of the insert 816.

The venting arrangement of a conventional spray head and spray bottle should be maintained with use of the insert 816 according to the present invention. Specifically, a conventional spray head vents air back into the spray bottle to compensate for liquid being withdrawn from the spray bottle during use. Otherwise, as the spray bottle is evacuated, a vacuum condition will be created therein making suction of the liquid through the downtube more difficult or impossible.

The conventional spray head is provided with an air passageway to vent air in an upper neck portion of the spray bottle. The insert according to the present invention could potentially interfere with venting when used with a conventional spray head and conventional spray bottle, since the insert is essentially a plug in the upper neck portion of the spray bottle.

The insert 816, bayonet device 818 and washer 824 can all be designed to facilitate venting, however, it has been found during experimental use that even small micro cracks through or between these components is satisfactory for venting the spray bottle without purposely designing venting features in these components. For example, the through hole 828 in the insert 816, shown in FIG. 28, can be slightly oversized relative to the outer diameter of the downtube 804 providing a liquid and/or air passageway. The washer 820 of the bayonet device 818 can have various designs, for example, like those shown in FIGS. 41–43. In the embodiment shown in FIG. 41, the through hole 820a has an inner diameter slightly less than the outer diameter of the downtube 804 to provide a slight interference fit between the washer 820a and the downtube 804. Thus, little if any venting can occur between the washer 820 and the downtube 804. However, even with this embodiment, it has been found that sufficient venting occurs through micro cracks in use. In an improved embodiment shown in FIG. 42, the washer 820" again is provided with a through hole 820a" having an inner diameter slightly less than the outer diameter of the downtube 804 providing a slight interference fit therebetween. However, a partial circular groove or slot 820b" is provided substantially at the same radius as the location of the bayonet 822". Thus, after the initial reservoir has been ruptured and the bayonet device has been rotated 90°, 180° or 270°, the partial circular groove 820b" is aligned with and overlaps the puncture holes in the sealing membrane 822 previously made by the bayonet 822. Since the previous reservoirs are also punctured at the bottom wall portion of the insert 816, a completed liquid and/or gas passageway is provided through that particular reservoir of the insert. In a further alternative embodiment, the washer 820'" is provided with a square through hole 820a'". The width of the square through hole 820a'" is slightly less than the outer diameter of the downtube 804 to provide a slight interference fit therebetween. The corners of the square through hole 820a'" serve as four (4) vents between the upper and lower surfaces of the washer 820'". Thus, a clear passageway for liquid and/or gas is established through the bayonet device 818 and insert 816 along the sides of the downtube 804. The washer 824 shown in FIG. 27, can also be provided with the same or similar design to the washer 820 of the bayonet device 818 to also facilitate venting of gas and/or liquid from the spray head into the spray bottle. Various other designs and configurations of the bayonet device 818 and washer 824 can be designed and adapted for various applications. Due to the many variables affecting venting, all designs should be tested to ensure that adequate venting occurs between the spray head and spray bottle. Again, only very small micro cracks between components or through components are necessary to provide sufficient venting. Further, in the application of a two-neck bottle, additional venting can occur between the cap 814 and second neck portion 812 in the spray bottle shown in FIG. 27.

The insert 816 can be provided with additional modifications and designs for use in various applications and with various conventional and non-conventional spray head and spray bottle components. The insert 816" shown in FIG. 44 is provided with an additional through hole 828a for accommodating and storing the bayonet 822 of the bayonet device 820 when the spray dispensing apparatus 800 is assembled. Otherwise, the bayonet 822 of the bayonet device 818 can be stored in one of the reservoirs 826a, 826b, 826c, 826d. In a further alternate embodiment, insert 816'" as shown in FIGS. 46 and 47 is provided with an upper wider through passageway portion 828a'" and a lower through passageway portion 828b'". The wider upper through passageway portion 828a'" has been widened significantly over the outer diameter of the dip tube 804 to accommodate various spray head designs which have portions extending down from the spray head into the first neck portion of the spray bottle. For example, a CALMAR spray head is provided with a tubular receiver extending down from the spray head for receiving an upper portion of the downtube. The insert 816'" can be further modified to properly cooperate and mechanically interface with the structure of various other conventional and non-conventional spray heads. These are examples of such modifications that need to be made to provide for proper assembly and operation of the completed spray dispensing apparatus.

FIGS. 48–50 show an additional embodiment of an insert 816"" according to the present invention. In this embodiment, one quadrant of the bottom wall portion 816d' is purposely made void to provide an additional through hole for accommodating the bayonet 822 of the bayonet device 818. The insert 816"" can be molded in this specific configuration. Further, the additional through hole provides substantial venting for gas and/or liquids, and could be potentially utilized for adding water through the insert itself in the application of the insert 816"" in a conventional one-neck spray bottle to allow filling with both concentrate and water (i.e., eliminates need for two-neck spray bottle).

Alternatively, the insert 816 shown in FIG. 52 can accommodate the bayonet 822 of the bayonet device 818 in one of the four (4) reservoirs 826a, 826b, 826c, 826d. However, the tip 822a will be forced through the bottom wall portion 816d in this embodiment. This particular reservoir can be filled with chemical concentrate causing the reservoir to rupture and release chemical concentrate into the spray bottle 808 during assembly, or can be a dummy chamber (i.e., not filled with chemical concentrate) in some applications.

The insert 816 according to the present invention can be manufactured, marketed and sold as a separate product unit as opposed to an entire spray dispensing apparatus 800 of the type shown in FIG. 27. In the spray dispensing apparatus 800, the insert 816 is essentially double packaged. Specifically, in the assembly shown in FIG. 27, once the spray bottle apparatus is assembled, the insert 816 which is a package, is packaged inside the spray bottle 808 itself Thus, any inadvertent leakage by the insert 816 will tend to leak into the spray bottle 808 preventing any inadvertent spillage exterior to the spray dispensing apparatus 800.

When the insert 816 is manufactured, marketed and sold as a separate stand alone unit, any leakage from the insert will be exterior to the insert. For instance, the sealing membrane 828 in some embodiments (e.g., metal foil) is somewhat susceptible to easy puncture or damage which could cause inadvertent spillage or contamination. Further, any leakage from the insert of the chemical concentrate could cause damage to packaging or damage to other commercial or other household products and/or facilities storing such an insert. Most important, any spillage could be a personal hazard, in particular to children, who could inadvertently come into contact with or even ingest chemical concentrate causing serious injury or potentially death. Thus, it is preferred to provide an additional sealing or protecting means to an upper portion of the insert or encompassing the entire insert, particularly for consumer use. For example, the insert can be blister packed or packaged in a manner so that the insert is fully encompassed by sealed packaging. Alternatively, only the upper portion of the insert 816 is further protected. For example, as shown in FIG. 52, the bayonet device 818 can be connected to the insert 816 by driving the bayonet 822 through a dummy chamber and through the bottom wall portion 816d of the insert 816. Due to the bayonet tip 822a penetrating through and rupturing the bottom wall portion 816d, the bayonet device 818 is now removably connected to the insert 816 (i.e., tip 822a is held by bottom wall portion 816d). Thus, the washer portion 820 protects the sealing membrane 828 located between the bottom surface of the washer portion 820 and the upper surface of the insert 816. Alternatively, the washer 820 can be connected to the upper portion of the insert 816 by adhesive, thermal welding, inductive welding, ultrasonic welding or other suitable method to more securely releasably connect the washer 820 to the insert 816 to require a user to pry the bayonet device 820 from the insert 816 when assembling the spray dispensing apparatus 800.

As shown in FIGS. 53 and 54, the insert 816 is provided with an additional sealing device (e.g., child safety cap) to further protect the sealing membrane 828 against any damage and leakage. In the event the sealing membrane 828 should fail, the safety cap 832 biases the sealing membrane 828 against the upper sealing surfaces of the insert to maintain an adequate seal. The safety cap 832 can be made of various resilient plastic materials including polyurethane, nylon, polyvinyl chloride and other suitable materials. The safety cap 832 is provided with an inner peripheral groove 834, which accommodates the edges of the upper flange 817a. Due to the resilience of the safety cap 832, the safety cap can be snap fit over the edges of the flange to provide an additional sealing means.

Reactive Chemistry

A preferred embodiment of the present invention is directed to a spray dispensing apparatus having an insert and the insert itself The insert is provided with at least one reservoir for containing chemical concentrate. In a preferred embodiment, the insert is provided with multiple reservoirs for containing separate charges of chemical concentrate.

In the preferred embodiment having multiple separate reservoirs, the insert according to the present invention can be provided with chemical concentrate of the same concentration or chemical concentrate of different concentrations. Further, different chemical compositions can be contained in the separate reservoirs for providing various chemical mixtures. In a preferred embodiment, two or more different reactive chemicals are stored in separate reservoirs that can be both ruptured to allow mixing of these chemicals with or without water initially to form a reactive chemical mixture. Storage of chemicals in this manner ensures freshly reacted chemicals having the highest level of activities. Performance chemicals ranging from applications for personal care, surface cleaners, disinfectants, insecticides and other known classes of chemical compounds that can be formed by mixing two or more different charges of chemicals together can be dispensed with the spray dispensing apparatus and insert according to the present invention.

Other configurations of the spray bottle dispenser are shown in FIGS. 55 and 56. In the embodiment shown in FIG. 55, an additional insert 816 is provided in the second neck portion 812 of the spray bottle 808. This arrangement would provide an extra four (4) charges of chemical concentrate for storage in the second neck portion of the spray bottle 800'. In the embodiment shown in FIG. 56, the bayonet device 818 is stored as a separate unit in the second neck portion 812 of the spray bottle 808. A user unscrews the cap 814 to retrieve the bayonet device 818, dissassembles the insert 816 and washer 824 from the downtube 804, and then assembles the bayonet 818, washer 824 and insert 816 onto the downtube 804 prior to installing the subassembly into the spray bottle 808. In this manner, the bayonet device 818 can be stored inside the spray bottle dispensing apparatus 800" without comprising or rupturing one of the four (4) reservoirs containing chemical concentrate allowing for four fills or refills of chemical concentrate. In this manner, the spray bottle dispensing apparatus can be shipped empty (i.e., no liquid in the spray bottle 808 but only chemical concentrate inside the insert 816). Thus, the spray dispensing apparatus 800" can be shipped to a distributing center or point-of-sale at a greatly reduced weight, since the spray bottle 808 is not provided with liquid contents. Alternatively, the spray bottle 808 can be also supplied with liquid contents providing an initial fill of working chemical and four (4) refills, however, there will be no weight savings compared with a conventional spray bottle device.

Alternative Cap Type Embodiments

A cap device 900 can be used with a one-neck spray bottle or multiple-neck spray bottle to provide at least one dose or charge of chemical concentrate into the spray bottle. As shown in FIGS. 57–59, a multiple reservoir cap 900 can be provided to add two or more chemicals, preferably reactive chemicals to dose a spray bottle. The cap 900 includes an upper cap portion 902 nested within a lower cap portion 904. The upper cap portion 902 is shown provided with two separate reservoirs 904a and 904b for containing separate charges of chemical concentrate, again preferably reactive chemicals.

The bottom end of the upper cap portion 902 is provided with a sealing membrane 906 to seal the lower ends of the reservoirs 904a, 904b. The lower cap portion 904 is provided with a frangible bottom wall portion 904a provided with a peripheral groove 904b to provide a breakable wall portion.

The bottom wall portion 904a is provided with protrusions 904c, preferably sharpened, which will puncture and rupture the sealing membrane 906 when the upper cap portion 902 is further driven downwardly into the lower cap portion 904. Upon further driving the upper cap portion 902 downwardly into the lower cap portion 904, the lower edge of the upper cap portion 902 will cause the bottom wall portion 904a to break away and release the chemicals into a spray bottle to which the cap 900 is applied. A center rib 908 separates the one reservoir 904a from the other reservoir 904b.

The cap 900 is inserted into a neck portion of a spray bottle, Specifically, the lower cap portion 904 is received in the neck portion with the upper flange 904a resting on the upper edge of the neck portion of the spray bottle. The inner threads 902a of the upper cap portion 902 engage with the external threads of the neck portion of the spray bottle to force the upper cap portion 902 downwardly into the lower cap portion 904. The sealing membrane 906 is forced into the protrusions 904c causing the two reservoirs 904a and 904b to rupture releasing chemical. As the upper cap portion 902 is further rotated, the lower edge of the upper cap portion 902 is rammed into the frangible bottom wall portion 904a of the lower cap portion 904 causing it to break and release chemical into the spray bottle.

Another embodiment of a cap device 900' is shown in FIG. 62. In this embodiment, the bottom wall portion 904a' of the lower cap portion 904' is provided with a shorter height protrusion 904c' and a higher height protrusion 904d' and a hole 904e'. The differential height of the protrusions 904c' and 904d' allow for the reservoir 904a' to be selectively comprised without immediately comprising reservoir 904b'. Any chemical released from either reservoir enters the chamber between the upper cap portion 902 and lower cap portion 904 and drains through the through hole 904e'. Thus, the cap 900' can be partially rotated to rupture reservoir 904a' to charge the spray bottle, and then at a later time the cap can be reused and further rotated to then comprise the other reservoir 904b'. Thus, this multiple reservoir cap can provide for selective release of chemical for charging or recharging a spray bottle at different times.

Reverse Bayonet Embodiments

In an alternative embodiment shown in FIG. 61, a combined cap and bayonet device 818' is shown. The device 818' includes a bayonet device 818 connected to a cap 814' by a protrusion 814a'. For example, the protrusion 814a' can be configured to snap fit through hole 820a in the washer 820 of the bayonet device 820. In this embodiment, the bayonet device 820 can freely rotate around the protrusion 814a' relative to the cap 814'. In addition, a washer or seal can be provided on the lower side of the washer 820 to enhance sealing between the cap and bayonet device 818'.

An alternative to the bayonet device 818 is shown in FIG. 62, as a "reverse-bayonet" configuration. Specifically, the reverse-bayonet configuration utilized a cartridge receiver 1000 including a "reverse" bayonet portion 1002. The cartridge receiver 1000 is defined by an upper flange portion 1000a, a cylindrical portion 1000b, and a lower wall portion 1000c having a through hole 1000d. The "reverse" bayonet portion 1002 is configured (e.g. pointed, beveled, sharpened) to penetrate through a bottom of the cartridge 816 when the cartridge is forced downwardly into the cartridge receiver 1000 releasing substance stored in the cartridge 816.

The bayonet portion 1002 is designed or configured to compromise the bottom of the cartridge 816 in a manner to puncture at least one reservoir of the cartridge 816. Alternatively, multiple bayonet portions 1002 can be provided extending upwardly from bottom wall portion 1000d at different locations (e.g. at 180 degrees, 90 degrees) to simultaneously puncturing two (2), three (3), four (4) or more reservoirs of the cartridge 816. Alternatively, the multiple bayonet portions 1002 can have different heights to selectively puncture one reservoir by forcing the cartridge 816 into the cartridge receiver 1000 to a first extent, and then puncture another reservoir at a time interval later to puncture a second reservoir by forcing the cartridge 816 further into the cartridge receiver 1000 to a second extent.

The method of puncturing the bottom of the cartridge 816 must be sufficient to cause adequate release (e.g. drainage) of the cartridge. In the case of a liquid, the puncture must allow some venting of the puncture reservoir of the cartridge 816. This can be accomplished by providing the bayonet portion 1002 with various tip designs (See FIGS. 36 to 39), slightly rotating (e.g. back-and-forth) the cartridge 816 in the cartridge receiver 1000 to increase the size of the puncture hole, and/or providing a through hole in the bayonet portion 1002. In different embodiments of the cartridge 816, puncturing occurs through a foil, film or other type of end seal of the cartridge 816, or through the plastic molded bottom of the cartridge 816. In a further alternative, the bayonet portion 1002 may be a separate piece (e.g. made of metal to further facilitate cutting or puncturing) rather than the integral molded bayonet portion 1002 shown in FIGS. 62 and 63.

Figure 64:
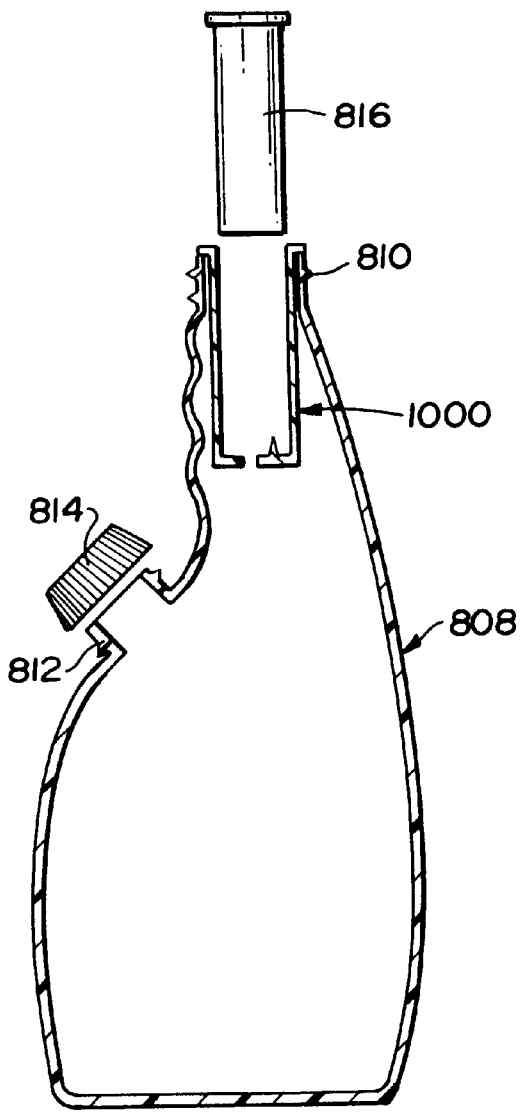
FIG. 64 is a side cross-sectional view of a spray bottle device according to the present invention.

The cartridge receiver 1000 can be provided in the neck portion of a single neck bottle. In a multiple neck bottle, one or more cartridge receivers 1000 can be provided in one or more neck portions. In the embodiment shown in FIG. 64, a cartridge receiver 1000 is provided in the first neck portion 810 of the two-neck bottle 808. Alternatively, the cartridge receiver 1000 could be positioned in the second neck portion 812, or two cartridge receivers 1000 could be provided in each neck. The cartridge receiver 1000 is shown as a separate component relative to the bottle 808, however, the bottle could be formed (e.g. blow molded and/or injection molded) with a cartridge receiver integrally molded into one or more necks of a bottle. The separate cartridge receiver 1000 can be removably connected or substantially permanently connected (e.g. heat welding, sonic welding, mechanical connection, mechanical snap-fit connection, adhesive or bonded connection) to the bottle 808.

Figure 65:
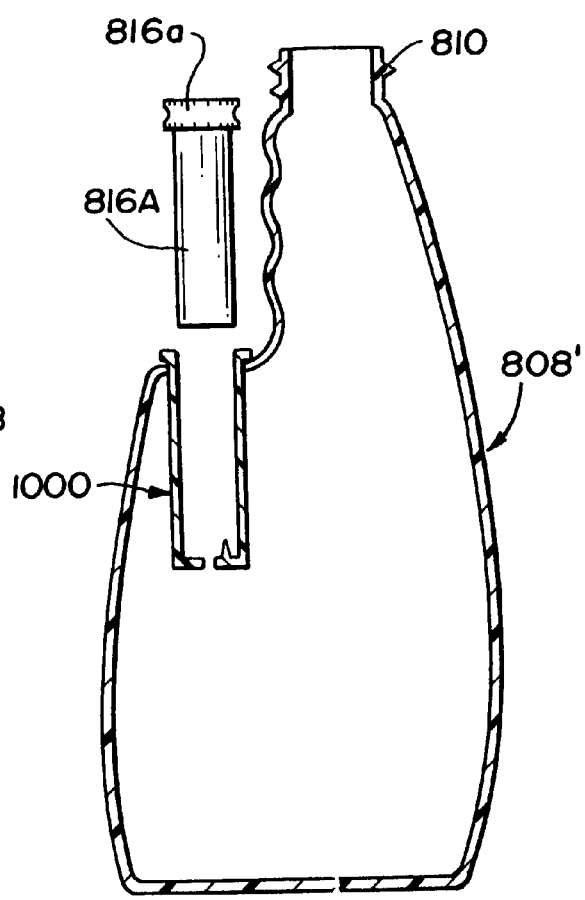
FIG. 65 is a side cross-sectional view of another spray bottle device according to the present invention.

In another embodiment, the cartridge receiver 1000 is provided through a wall portion of the bottle 808, as shown in FIG. 65. For example, a hole can be provided through a wall portion of the bottle 808', and a cartridge receiver 1000 can be installed in the hole by heat welding, sonically welded, mechanical connection, adhesive or bonded connection, and/or other suitable means. These methods are particularly suitable where both the bottle 808 (808') and the cartridge receiver 1000 are both made of plastic, in particular the same or similar plastic. Alternatively, the bottle 808' can be formed (e.g. blow molded and/or injection molded) with an integrally molded cartridge receiver 1000 at a wall portion of the bottle 808'.

Figures 66, 67, 68:
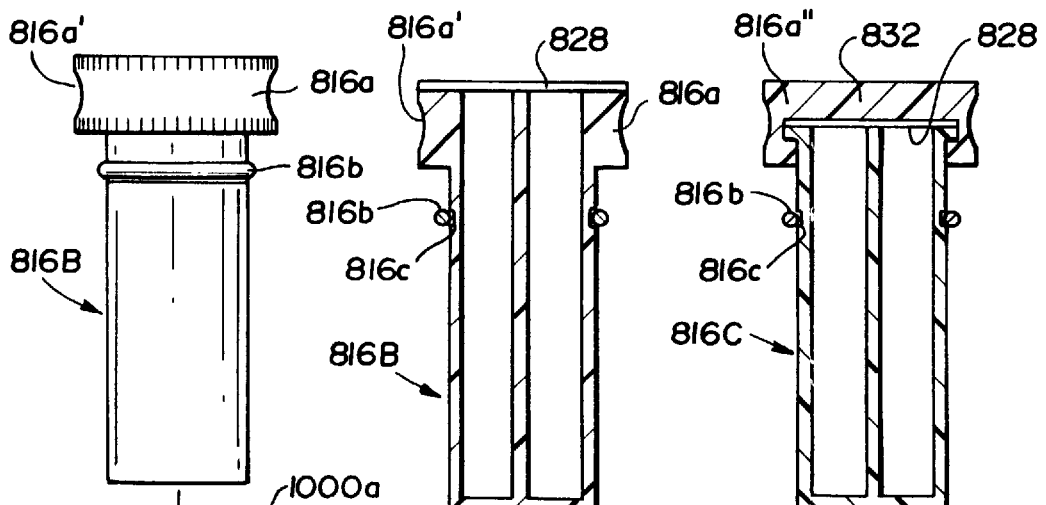
FIG. 66 is a side elevational view of a cartridge and a cross-sectional view of a cartridge receiver according to the present invention shown the direction an manner of insertion of the cartridge into the cartridge receiver.
FIG. 67 is a center vertical cross-sectional view through the cartridge shown in FIG. 66.
FIG. 68 is a center vertical cross-sectional view through another embodiment of the cartridge according to the present invention.

The cartridge 816A shown in FIGS. 65–67 is provided with a gripping portion 816a having an annular indentation 816a' to facilitate gripping by a user's fingers and thumb during removal and replacement of the cartridge 816A. In this embodiment, the cartridge is held within the cartridge receiver 1000 by a function fit. Specifically, the outer diameter of the cartridge 816A is slightly greater relative to the inner diameter of the cartridge receiver 1000. In another embodiment of the cartridge 816B shown in FIGS. 66 and 67, the cartridge 816B is fitted with a seal ring 816b (e.g.

"O" ring) received within an annular groove 816c of the cartridge 816B. The cartridge receiver 1000 is provided a corresponding annular groove 1000e for receiving a portion of the sealing ring 816b when the cartridge 816B is fully inserted into the cartridge receiver 1000 for removably connecting the cartridge 816B within the cartridge receiver 1000.

The upper end of the cartridge 8166B is provided with a sealing membrane 828 while the lower end of the cartridge 816B has an integrally molded bottom portion. In the embodiment shown in FIG. 68, the upper end of the cartridge 816C is provided with a cap 832 for protecting the sealing membrane 828 and providing a "double" seal. In this embodiment, the cap 832 defines a gripping portion 816a'''. Thus, in the embodiment shown in FIG. 67, the gripping portion 816a' is an integrally molded portion of the cartridge 816B while in the embodiment shown in FIG. 68, the gripping portion is a separate component relative to the cartridge 816C.

Figure 69:
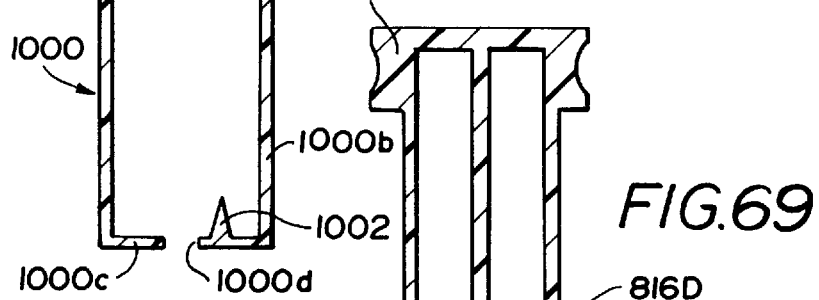
FIG. 69 is a center vertical cross-sectional view through a further embodiment of the cartridge according to the present invention.

In a further embodiment shown in FIG. 69, the bottom end of the cartridge 816D is provided with a sealing membrane 828 and an integrally molded gripping portion 816a'''. Preferably, the cartridge 816D is stored upside-down and the end having the sealing membrane 828 is provided with a cap or second seal (e.g. sticky back cardboard or foam wafer seal) for protecting the sealing membrane 828.

Figures 70, 71, 72, 73:
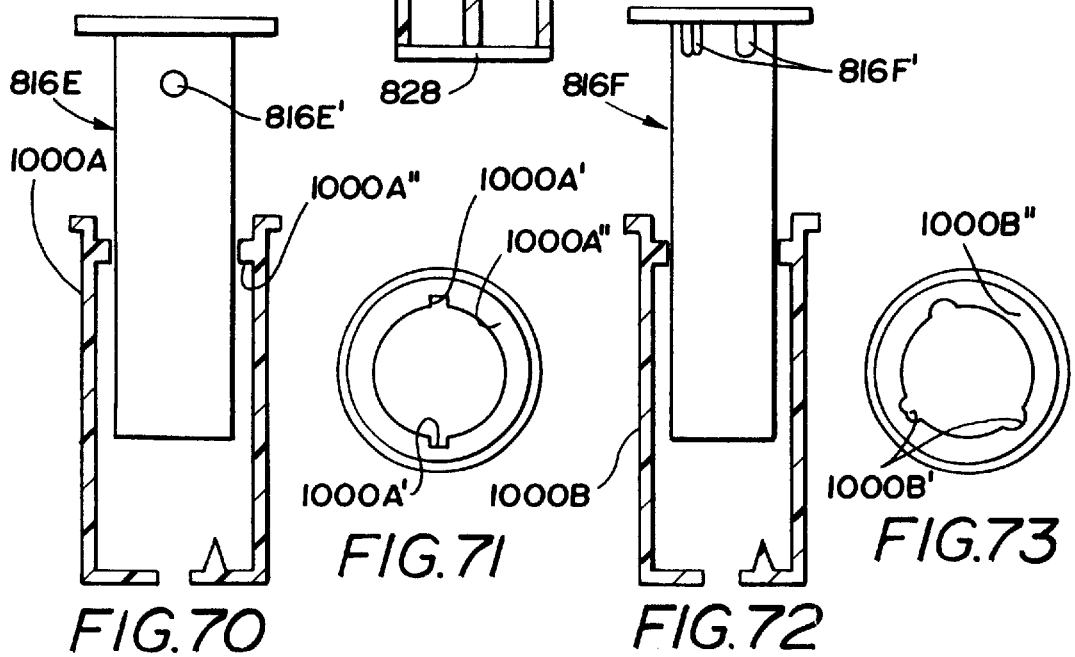
FIG. 70 is a side elevational view of a cartridge and a center vertical cross-sectional view through a cartridge receiver having a bayonet type connection therebetween according to the present invention.
FIG. 71 is a top elevational view of the the cartridge receiver shown in FIG. 70.
FIG. 72 is a side elevational view of a cartridge and a center vertical cross-sectional view through a cartridge receiver having a keyed arrangement therebetween according to the present invention.
FIG. 73 is a top elevational view of the cartridge receiver shown in FIG. 72.

In an even further embodiment shown in FIG. 70, the cartridge 816E "positively" locks into the cartridge receiver 1000A. Specifically, the cartridge 816E is provided with a pair of protrusions 816E', which pass through a pair of slots 1000A' provided in an inner flange 1000A'' of the cartridge receiver 1000A. When the cartridge 816E is fully inserted into the cartridge receiver 1000A, the cartridge 816E is rotated locking the protrusions 816E' underneath of the inner flange 1000A''. The cartridge 816E can be removed by rotating the cartridge 816E in the opposite direction, and then lifting upwardly.

The cartridge and cartridge receiver can be configured to provide a key arrangement. Specifically, the cartridge and cartridge receiver can be keyed in such a manner so that only a specific configuration of a cartridge can be fit into a specific configuration of a cartridge receiver. The key arrangement can be utilized, for example, to allow only one type of chemical to be used in one type of bottle (e.g. color coded bottles and cartridges to indicate type of chemical and/or cleaning use). The key arrangement can also be utilized for marketing purposes to eliminate competitors from using bottles and/or cartridges providing an exclusive product or product lines. The keying arrangement can be utilized with different size and/or shape cartridges and/or cartridge receivers or neck portions to provide the same effect or other related effects.

As shown in FIGS. 72 and 73, the cartridge 816F can be provided with a keyed arrangement of protrusions 816F' cooperating with a keyed arrangement of slots 1000B' provided in an inner flange 1000B''. For example, the cooperating keyed arrangement of protrusions 816F' and slots 1000B' can have different widths, thickness, locations, groupings or other keying arrangements so that only a specifically keyed cartridge 816F will properly fit into a corresponding keyed cartridge receiver 1000B. Alternatively, as shown in FIGS. 74 and 75, the neck portion 810' itself can be provided with an integrally molded keyed arrangement of slots 810a' provided in an inner flange 810a''' to cooperate with a keyed arrangement of protrusions 816F' of cartridge 816F.

The dispenser according to the present invention is particularly suitable for storing multiple separate quantities of substances, in particular concentrated substances. The substance or concentrated substances can be provided in various forms including pills, tablets, wafers, vials, balls (e.g. like paint balls), separate containers, bubble packs, blister packs, test tubes, and other forms or containers. The substance or concentrated substance can be solids, liquids, gases, solutions, powders, microencapsulate substances, slurries, pastes, multi-phase mixtures or solutions, granules and other phases and/or states.

As shown in FIGS. 76 and 77, a spray bottle dispenser 1100 is shown including a cartridge 1102 provided in the second neck portion 812. The cartridge 1102 contains a plurality of separate chemical concentrate tablets 1104 in a stacked arrangement. The cartridge 1102 can be configured to be insertable and removable cartridge to allow replacement with another cartridge. Alternatively, the cartridge 1102 can be configured to be substantially non-removable from the spray bottle 808 after insertion into the second neck portion 812.

The cartridge 1102 is provided with an upper seal 1106 to seal the contents of the cartridge from air, moisture and contamination during storage, shipment and use. Alternatively, or in addition, a removable cap seal is provided for sealing the opening into the cartridge 1102. The seal can be made from a variety of materials including foils, films, multi-layer films, papers, cardboards, laminations, composite materials, and other suitable materials. The tablets 1104 are shown stacked in contact with each other, however, the tablets 1104 can optionally be individually wrapped or package to further preserve the tablets and prevent the tablets from sticking together for some applications of various chemical compositions. Further, the tablets 1104 can be replaced by thinner wafers of a more concentrated chemical substance to increase the number of separate charges contained in the cartridge 1102 to provide a greater number of recharges of the spray bottle dispenser.

A desiccator 1108 may also be supplied to maintain a moisture free environment within the cartridge 1102. The desiccator 1108 can be a separate unit, or can be incorporated into a cap seal for the cartridge 1102. The desiccator 1108 is shown at the top of the cartridge 1102, however, it can be located at other positions inside the desiccator, and other separated desiccators can be added to effectively maintain a moisture free environment inside the cartridge 1102.

A user operates the spray bottle dispenser by removing the cap 814 and film 1106 (partially or fully), and then removing one or more tablets 1104 from the cartridge 1102. The user can decide to use one, two or more tablets to selectively vary the concentration of working mixture desired depending on various applications. For example, for a glass cleaner one tablet is used in making the solution while in the case of a surface cleaner two tablets are used in making the solution. The one or more tablets 1104 can be removed by tilting the spray bottle 808, or in the case of a removable cartridge configuration, the cartridge 1102 can be removed from the second neck portion 812 and then tilted itself After removing one or more tablets 1104, the cartridge 1102 is sealed by the cap 114, or in addition, a seal (e.g. sticky back foil or film) or sealing device (e.g. cap or cork) can be utilized to ensure a good seal. The tablets can be added through the first neck portion 810 20 (i.e. after removal of spray head 802) and/or through the second neck portion along with diluent such as water depending on whether the cartridge 1102 is removable or nonremovable from the second neck portion 810.

In another embodiment of a cartridge 1202, as shown in FIG. 78, a plurality of separate packets or containers 1204 are loaded into the cartridge 1202 in a stacked arrangement. The packets can be substantially dry chemical concentrate (e.g. powder, film, microencapsulated, sealed paste, granules) molded or formed into a packet with or without an outer sealing membrane or seal. The containers 1204 can be made of dissolvable or non-dissolvable material(s) (e.g. dissolvable membrane, foil, film, paper, plastic, injection molded polyethylene or polypropylene, vacuum formed film like polystyrene or polyvinyl, etc.), and each provided with a removable foil or film 1206 having a gripping portion 1208 to facilitate removal. The cartridge 1202 is used in the same manner as the cartridge 1102 except the foils or films 1206 are removed from the separate containers 1204 during use. Alternatively, the foils or films 1206 can be replace with a moisture dissolvable seal eliminating the need for the foils or films 1206 to be removable prior to loading into the spray bottle 808.

Figure 79:
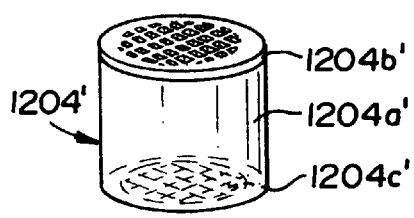
FIG. 79 is a perspective view of another embodiment of an individual container having upper and lower screen portions.
Figure 80:
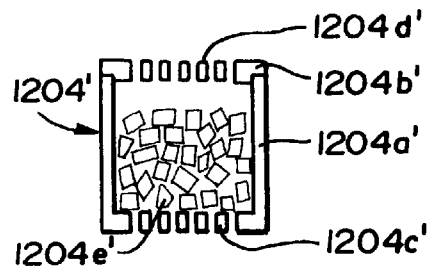
FIG. 80 is a center vertical cross-sectional view of the individual container shown in FIG. 79.

Another embodiment of the container 1204', as shown in FIGS. 79 and 80, can be used in the cartridge 1202 shown in FIG. 78. In this embodiment, the container 1204' includes a lower cup-shaped portion 1204a' and an upper portion 1204b'. The container 1204', for example, can be made of injection molded plastic parts (e.g. polyethylene) that snap-fit together for assembly. The lower portion 1204a' is provided with a bottom screen portion 1204c', and the upper portion 1204b' is provided with an upper screen portion 1204d', respectively. Chemical concentrate 1204e' (e.g. granules, tablets, powder, micro capsules, paste, etc.) can be loaded into cup-shaped lower portion 1204a', and then the upper portion 1204'b can be snap fit into the lower portion 1204a'.

During use, the container 1204' can be loaded through the first neck portion 810 or second neck portion 812 of the spray bottle 808. When a diluent such as water is added to the spray bottle 808, before or after loading the container 1204' into the spray bottle 808, the diluent enters into the container 1204' through the screen portions 1204c' and 1204d' to dissolve the chemical concentrate 1204e'.

Recharging Containers and/or Dispensers

The cartridge system according to the present invention can be utilized to charge and recharge numerous types of containers and dispensers.

As shown in FIG. 80, a container 1300 includes a carrying handle 1302 and cap 1304. The container 1300, for example, can be a plastic blow molded container. The container 1300 can be various sizes, including cup, pint, quart, gallon, ½ liter, liter, multiple ounce (e.g. 10 oz., 12 oz., 14 oz., 15 oz., 16 oz., 18 oz., 20 oz., 21 oz., 22 oz., 24 oz., 26 oz, 28 oz., etc.) sizes.

The container 1300 is provided with a cartridge 1306. The cartridge 1306 is the same or similar to the cartridge embodiments shown in FIGS. 2–6B and 26–80.

A particularly suitable embodiment of a cartridge system according to the present invention for charging and recharging containers and dispensers is shown in FIGS. 81–84. In this embodiment, the cartridge 1306 fits into a cartridge receiver 1308 provided in the neck portion of the container 1300. The cartridge receiver 1308 can be removable or non-removable (e.g. snap fits into neck portion). Alternatively, the cartridge receiver 1308 is integrally molded into the neck portion of the container 1300. The cartridge receiver 1308 is preferably made of plastic (e.g. polyethylene, polypropylene, polyvinyl chloride, polyethylene teraphalate (PET), PETE, and other suitable plastic materials for making containers). However, the cartridge receiver 1308 could be made of metal, ceramic, composite or other suitable material.

Figure 81:
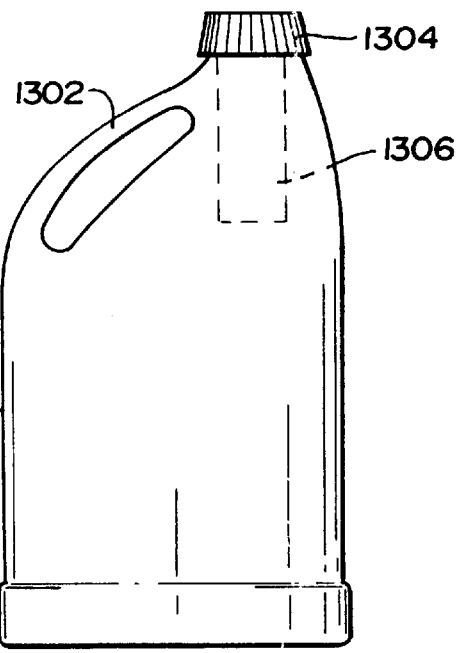
FIG. 81 is a side elevational view of a container provided with a cartridge for charging or recharging the container.
Figure 82:
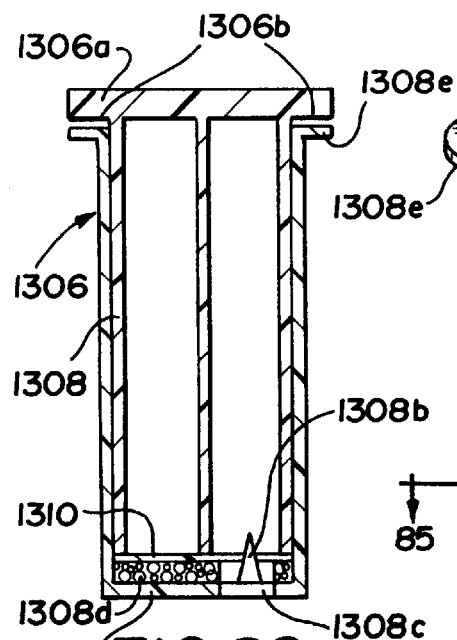
FIG. 82 is a vertical cross-sectional view of a cartridge disposed within a cartridge receiver having a "reverse" bayonet.
Figure 83:
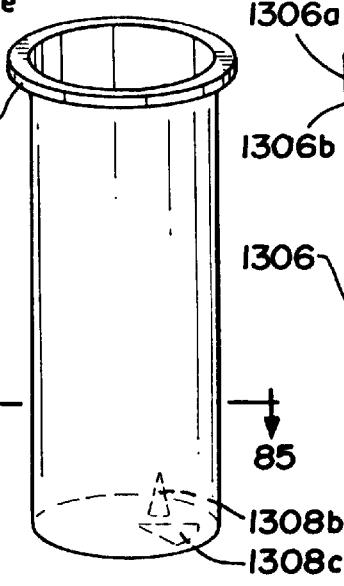
FIG. 83 is a perspective view of the cartridge receiver shown in FIG. 82.

The cartridge 1306 shown in FIG. 81 is a four (4) chamber cartridge. The cartridge can be a single or multiple chamber (e.g. two (2), three (3), four (4), five (5), six (6), seven (7), eight (8), nine (9), ten (10), or more number of chambers). The cartridge 1306 is integrally molded closed at one end, and provided with a foil or film seal 1310 at the other end. Typically, this cartridge 1306 would be filled with a substance (e.g. liquid chemical concentrate such as soap, detergent, bleach, glass cleaner, surface cleaner, disinfectant, etc.) when oriented with the open end upward following by sealing. Further, the cartridge 1306 would be stored with the foil or film seal end upward so that the seal is not in direct contact with the substance. In addition, a second seal (e.g. cap or safety cap) could be provided over the foil or film seal 1310 to protect the seal 1310 against damage (e.g. cuts, punctures, etc.) and provide a double seal during shipment and storage. In preferred embodiments, the foil or film seal 1310 is applied to the cartridge 1308 by a cap seal that is subject to a radiated or inductive heat process.

The bottom wall 1308a of the cartridge receiver 1308 is provided with a "reverse" oriented bayonet 1308b and a through hole 1308c. In addition, a seal 1308d (e.g. foam, paper, card board, film, composite layer) is provided in the bottom of the cartridge receiver 1308.

Figure 84:
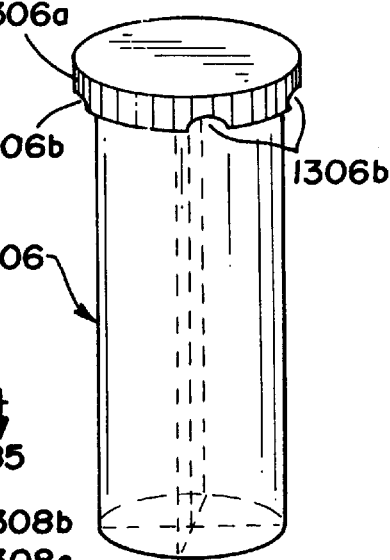
FIG. 84 is a perspective view of the cartridge shown in FIG. 82.
Figure 85:
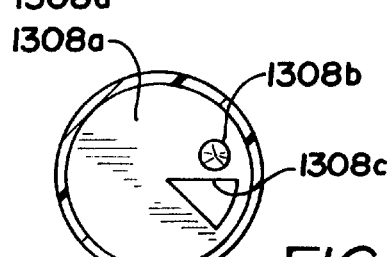
FIG. 85 is a horizontal cross-sectional view through the cartridge receiver as indicated in FIG. 83.

The through hole 1308c in the bottom wall 1308d of the cartridge receiver 1308, for example, can have the shape of a secant, as shown in FIG. 84. The secant in this embodiment is approximately one-eighth (⅛) the area of the circular-shaped bottom wall 1308a. The seal 1308d, as shown in FIG. 85, is provided with the same or similar opening, which is aligned with the opening 1308c in the bottom wall 1308a of the cartridge receiver 1306.

The bayonet 1308b is located in the remaining one-eighth (⅛) portion of the same quadrant portion as the opening 1308c, which is aligned with one of the four quadrant reservoirs of the cartridge 1308. The remaining three (3) quadrant portions of the bottom wall 1308a are closed (i.e. not open) so as to provide a second seal by means of the seal 1308d located in the bottom of the cartridge receiver 1308. Specifically, the seal 1308d biases against the seal 1310 of the cartridge 1306 when the cartridge 1306 is fully inserted into the cartridge receiver 1308. The seal 1308d provides a second seal, but also forces against the existing seal 1310 to maintain the integrity of seal 1310 with the edge and reservoir landings existing at the one end of the cartridge 1306 This arrangement, allows the cartridge 1306 to be maintained in the orientation shown in FIG. 81 (i.e. substance in contact with seal 1310) for prolong periods of storage in the bottle 1300. This arrangement helps to prevent any deterioration (e.g. separation, decomposition, weakening) of the seal 1310 during any prolong storage period The cartridge 1306 is provided with an upper flange 1306a having four (4) indents 1306b at a lower edge thereof to provide fingernail or thumb nail gripping points to facilitate removal of the cartridge 1306 from the cartridge receiver 1308. In addition or alternatively, the length of the cartridge 1306 and the length of the cartridge receiver 1308 can be selected so that the upper flange 1306a of the cartridge 1306 is slightly separated from the upper flange 1308e of the cartridge receiver 1308 (See FIG. 81), again to facilitate separation and removal of the cartridge 1306 from the cartridge receiver 1308.

In an embodiment of the container 1300 utilizing both the cartridge 1306 and cartridge receiver 1308, he container 1300 is filled or refilled by removing cap 1304 and cartridge 1306, if one is already installed. A diluent such a water is poured through the cartridge receiver 1308 into the container 1300. Specifically, the diluent such as water passes through the through hole 1308c in the bottom wall 1308a of the cartridge receiver 1308. The existing cartridge 1306 or a new cartridge 1306 is fitted into the cartridge receiver 1308. When the cartridge 1306 is forced downwardly within the cartridge receiver 1308, the bayonet 1308b punctures the foil or film seal 1310 of one of the quadrant reservoirs. The user can slightly rotate the cartridge 1306 back-and-forth to increase the size of the puncture hole through the foil or film seal 1310 to ensure adequate drainage of the contents of the quadrant reservoir into the container 1300 to then mix with the diluent such as water. The solution can be agitated, for example, by shaking the container 1300.

Figure 86:
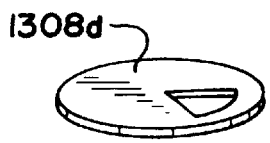
FIG. 86 is a perspective view of a circular seal having an opening provided in the cartridge receiver as shown in FIG. 82.

The solution can be poured from the container 1300 for use by either removing the cartridge 1306 or removing the assembly of cartridge 1306 and cartridge receiver 1308. Alternatively, one quadrant of the cartridge 1306' can be provided with a dummy reservoir and molded as a quadrant-shaped through passageway 1306c' open on both ends, as shown in FIG. 86, to allow solution to be poured from the bottle and through the cartridge 1306' without removing the cartridge 1306'. In this embodiment, after one quadrant reservoir is punctured and its contents drained, the cartridge 1306' is slightly lifted and rotated to align the quadrant shaped through hole with the through hole 1308c in the bottom wall 1308a of the cartridge receiver. Then, the cartridge 1306' is again forced downwardly into the cartridge receiver 1308. In another alternative embodiment, a circular through hole 1306c" is provided in the center of the cartridge 1306", as shown in FIG. 87.

In a one (1) reservoir cartridge system, the cartridge is removed from the cartridge receiver after the contents are drained to allow solution to be pour from the bottle through the cartridge receiver. In other alternative arrangement, both ends of the cartridge are provided with foil or film seals, which would allow one or more through passageways to be formed through the cartridge by breaking and removing the seal portions for each end for one or more reservoirs.

Other Dispensers

The double neck bottle according to the present invention can be utilized for a variety of applications.

As shown in FIG. 89, the spray bottle dispenser 1400 is provided with a push-pull nozzle closure 1402 provided on the second neck portion 812 instead of a cap 814 (See FIG. 26). This allows the spray bottle dispenser 1400 dispense a pre-mixed solution contained in the spray bottle 808 via the spray head 802, or dispense the same pre-mixed solution from the push-pull nozzle closure 1402 to another container (e.g. bucket). The pre-mixed solution contained in the spray bottle can be sufficiently concentrated to be further diluted with a diluent such as water after being dispensed to make a less concentrated solution. For example, the pre-mixed solution (e.g. grease cutting strength) can be dispensed in a separate bucket from the push-pull nozzle closure and water added to the bucket to make a less concentrated cleaner for general surface cleaning.

The spray bottle dispenser 1400 can also be used with the cartridge system according to the present invention as shown in FIGS. 26 and 27 and FIGS. 55 and 56.

In the embodiment shown in FIG. 90, a spray bottle dispenser 800 is associated with another dispenser 1500 including a container 1502 and push-pull nozzle closure 1504. The dispenser 1500 can be connected (e.g. mechanical fastener, coupling, two-compartment coaster), packaged (e.g. blister packed, shrink wrapped, boxed), or associated in some other suitable manner with the spray bottle dispenser 800. The dispenser 1500 contains a concentrated substance (e.g. liquid chemical concentrate) that can be added to the spray bottle dispenser 800 through the second neck portion 812 along with a quantity of diluent such as water. The spray bottle 808 can be designed to have a recess in a wall portion thereof to interlock and/or contain the smaller dispenser 1500.

In another embodiment shown in FIGS. 91 and 92, the spray bottle dispenser 1500 is provided with a combined push-pull nozzle closure 1502 connected to a cartridge 1504 (e.g. test tube-shaped container) for containing a liquid substance (e.g. liquid chemical concentrate). The push-pull closure 1502 is provided with an inner threaded flange 1502a cooperating with an outer threaded portion 1504a of the cartridge 1504. The push-pull closure 1502 is also provided with another inner threaded flange 1502b for cooperating with the outer threaded second neck portion 812 of the spray bottle 808. In use, the combined push-pull nozzle closure 1502 and cartridge 1504 are removed from the spray bottle 808 by unthreading. The chemical concentrate can be poured from the combined push-pull nozzle closure 1502 and cartridge 1504 by opening an pouring a quantity through the second nozzle portion 812 along with a quantity of diluent such as water. The combined push-pull nozzle closure 1502 is then threaded back onto the second neck portion 812 to again seal the spray bottle 808.

A two-neck dispenser 1600 is shown in FIG. 93. In this embodiment, a push-pull nozzle closure 1402 is provided on the first neck portion 810 of the bottle 808 while a cap 814 is provided on the second neck portion 812. In this manner, the dispenser can function as a refillable dispenser by charging or recharging the dispenser 1600 through the second neck portion 812 without disturbing or removing the push-pull nozzle closure 1402 to add convenience for filling by a user.

A beverage dispenser 1700 is shown in FIG. 94. A one chamber or multiple chamber cartridge 1702 is provided in the neck portion 1704 of the container 1706. The cartridge 1702 is provided with one or more content(s) for making one or more beverages when mixed with water. The contents of the cartridge 1702 are accessed, for example, by a straw 1708 having a pointed end 1708a. Alternatively, a separate bayonet device can be provided. The cartridge 1702 can be provided with a foil or film seal at both ends to facilitate puncturing with the straw 1708. Further, the cartridge can be provided with a circular through hole in the center thereof (See FIG. 6A) for accommodating the straw 1708.

A one (1) chamber cartridge 1800 is shown in FIGS. 95 and 96. The cartridge 1800 can be utilized for charging or recharging a container or system. The cartridge 1800 is provided with a funnel-shaped portion 1802 having an upper rim 1804. An upper screen 1806 and a lower screen 1808 are disposed within the cartridge 1800 for containing a concentrated substance 1810 (e.g. granules of chemical concentrate). The cartridge 1800 is configured and sized to fit into the neck of a container.

Figure 97:
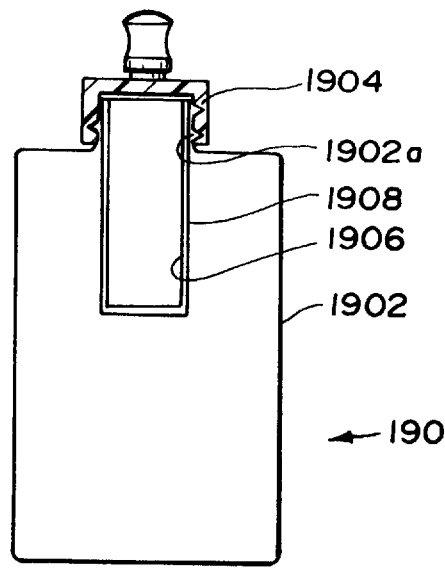
FIG. 97 is a side elevational view of a water bottle type container provided with a cartridge according to the present invention.

A water bottle type dispenser 1900 is shown in FIG. 97. The dispenser 1900 includes a container 1902 provided with a push-pull nozzle closure 1904. A cartridge 1906 and a cartridge receiver 1908 are provided in the neck portion 1902a of the container 1902. The cartridge receiver 1908 can be provided with a bayonet the same or similar to the cartridge receiver shown in FIG. 82. The cartridge 1906 can have one or more reservoirs for containing a concentrated drink substances (e.g. liquid, powder, granules, etc.)for making a drink (e.g. Gatoraide, Kool Aid) when mixed with water.

Figure 98:
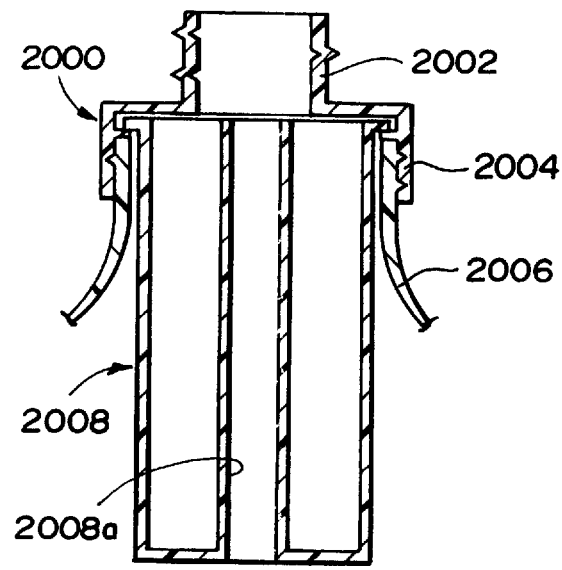
FIG. 98 is a center vertical cross-sectional view of an adapter threaded onto a container according to the present invention.
Figure 99:
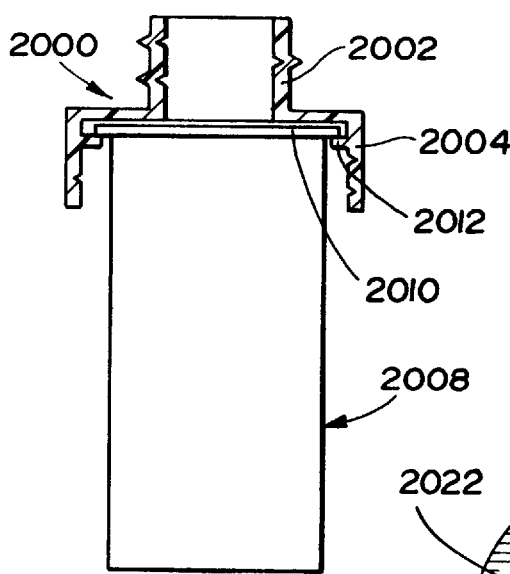
FIG. 99 is a side elevational view of the cartridge and center vertical cross-sectional view of the adapter shown in FIG. 98 assembled together.

An adapter 2000 can be provided between a container (e.g. wide mouth container) and a cap or spray head, as shown in FIGS. 98 and 99. The adapter 2000 is provided with an outer threaded neck portion 2002 (e.g. 28 millimeter) for connecting, for example, with a conventional trigger-type spray head. The adapter 2000 is also provided with an inner threaded portion 2004 for connecting with an outer threaded neck portion (e.g. 38 millimeter) of a container 2006.

A cartridge 2008 is removably connected to the adapter 2000. Specifically, the cartridge 2008 connects (e.g. snap-fit, threaded coupling, bayonet connection, etc.) with the adapter 2000. In the embodiment shown in FIG. 98, the cartridge 2008 is provided with an upper flange 2010, which removably press-fits or snap-fits with an annular inner edge 2012 provided on the inside of the adapter 2000.

The cartridge 2008 is similar to the cartridge 20' shown in FIG. 1, however, the center through hole 2008$a$ is substantially enlarged to allow diluent such a water to be poured through the cartridge 2008 during charging or recharging without removing the cartridge 2008 from the container 2006.

The arrangement shown in FIGS. 98 and 99 can be utilized with a stand alone or separate bayonet, an internal bayonet (See FIG. 99) or a "reverse" type bayonet type arrangement (See FIGS. 62, 63, 66, 70, 72, 81, 82, etc.).

Figure 100:
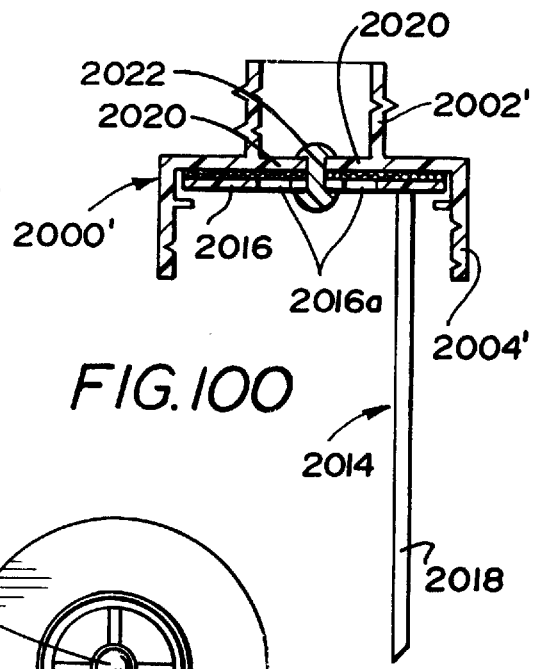
FIG. 100 is a center vertical cross-sectional view of an adapter provided with a freely rotating bayonet device.
Figure 101:
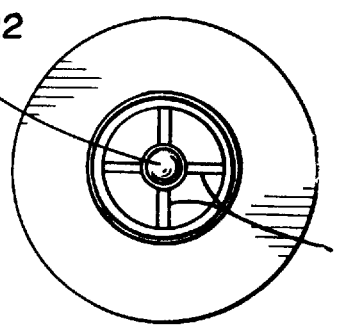
FIG. 101 is a top perspective view of the adapter shown in FIG. 100.

In FIGS. 100 and 101, the adapter 2000' is provided with a bayonet device 2014 defined by a washer 2016 having multiple through holes 2016$a$ and a bayonet 2018 extending therefrom. The adapter 2000' is configure so that the bayonet device 2014 "freely" rotates relative to the lower portion 2004'. Specifically, a set of spokes 2020 formed in the mouth of the neck portion 2002' provide a connection point for a plastic rivet rotatably connecting to the bayonet device 2014. This arrangement again allows a diluent such a water to be poured through the adapter 2000' for charging or recharging a container.

Reactive Chemistry

The multiple reservoir cartridge system according to the present invention can be utilized for making various multi-component mixtures or solutions, which chemically react. For example, one reactive component can be store in one reservoir and another reactive component can be stored in another separate reservoir. These reservoirs can be simultaneously accessed to allow the contents to mix inside the container. Alternatively, the substance in one reservoir can be reactive with the substance being added to the container. In any event, numerous reactive chemistry application can be provided with the multiple reservoir cartridge system according to the present invention. For example, a surface cleaner and a bleach can be stored in separate reservoirs to make a fresh solution of a high performance and reactive cleaner (e.g. mildew cleaner). The two components of a two part coating or paint can be stored in separate reservoirs of the same cartridge. The two components of a two part adhesive can be stored in separate reservoirs of the same cartridge.

EXAMPLES

I. Cold Ice Tea Product. A cartridge of the type shown in FIG. 6A can be used for making a cold ice tea beverage. Specifically, a liquid ice tea concentrate is stored in one (1) reservoir, a liquid or powder sugar is stored in two (2) reservoirs, and a liquid flavoring (e.g. lemon, raspberry, peach, etc.) is stored in one (1) reservoir. The cartridge can be used in the dispenser shown in FIG. 93 or FIG. 96. The user accesses only the one reservoir containing liquid ice tea concentrate to make an unsweetened ice tea beverage. The user can also decide to selectively add one or two reservoirs of sweeter depending on taste, and optionally selectively add the liquid flavoring again depending on taste. Cold water and ice can be added to the dispenser to complete the mixture by shaking.

II. Hot Coffee Product. A cartridge of the type shown in FIG. 6A can be used for making a cold ice tea beverage. Specifically, a liquid coffee concentrate is stored in one (1) reservoir, a liquid or powder sugar is stored in two (2) reservoirs, and a liquid nonrefrigerated creamer is stored in one (1) reservoir. The cartridge can be used in the dispenser shown in FIG. 93 or FIG. 96. The user accesses only the one reservoir containing liquid coffee concentrate to make an unsweetened coffee beverage. The user can also decide to selectively add one or two reservoirs of sweeter depending on taste, and optionally selectively add the liquid creamer again depending on taste. Hot water can be added to the dispenser to complete the mixture. The dispenser shown in FIG. 93 can be insulated (e.g. Styrofoam liner) to maintain the coffee beverage hot and protect the user from burns.

III. Beverage Product. A one (1) reservoir cartridge containing a sufficient quantity of Gatoraide or Kool-Aid powder mix to make a serving is loaded into the water bottle type container 1900 shown in FIG. 96. The cartridge is rotated one full turn to substantially open the entire bottom of the cartridge dropping the powder into the cartridge receiver. Water is added to the cartridge receiver dissolving the powder mix while flowing into the container.

IV. Soft Drink Product. A cartridge of the type shown in FIG. 6A can be used for making a soft drink beverage. Specifically, a liquid Coke or Pepsi concentrate is stored in one (1) reservoir, powdered carbonating substance is stored in one (1) reservoir, and two (2) different liquid flavorings (e.g. cherry syrup, vanilla syrup, chocolate syrup, etc.) are stored in two (2) reservoirs. The cartridge can be used in the dispenser shown in FIG. 93 or FIG. 96. The user accesses both the reservoirs containing liquid Coke or Pepsi concentrate and the powdered carbonating substance and optionally accesses one of the liquid flavorings make a soft drink beverage. The dispenser can be shook to mix the substances and activate the powdered carbonating substance.

V. Mouthwash Product. A one (1) reservoir cartridge containing a concentrated liquid mouthwash product is loaded into the neck portion of a used empty conventional mouthwash bottle. The reservoir is compromised with a separate disposable finger held bayonet device packaged with the reservoir to release the contents into the mouthwash bottle. Water is added from the tap to provide a full refill.

VI. Glass Cleaner Product. A four (4) chamber cartridge of the type shown in FIG. 6A is filled with concentrated liquid glass cleaner. The cartridge is inserted into the spray bottle dispenser of the type shown in FIGS. 26 and 27. A user selectively doses the spray bottle with one (1), two (2), three (3) or four (4) reservoirs of concentrate depending on the strength needed for the particular job.

VII. Bathroom and Mildew Cleaning Product. A four (4) chamber cartridge of the type shown in FIG. 6A is filled with two (2) reservoirs of concentrated liquid surface cleaner and two (2) chambers of concentrated liquid bleach. The cartridge is inserted into the spray bottle dispenser of the type shown in FIGS. 26 and 27. A user selectively doses the spray bottle with one (1) reservoir of concentrated liquid surface cleaner and one (1) reservoir of concentrated liquid bleach to form a reactive mixture. After full consumption of this mixture, a second batch of reactive mixture can be made from the chemicals in the remaining two (2) reservoirs.

VIII. Automotive Glass Cleaner Product. A cartridge of the type shown in FIGS. 94 and 95 is provided with a concentrated dry packet of glass cleaner. The cartridge is configured to fit into the standardized fill spout on an automobile for refilling the window washer reservoir. The cap of the fill spout is removed, the cartridge insert, and water from a garden hose is passed through the cartridge, which generates a liquid window washer solution within the window washer reservoir of the automobile.

We claim:

1. A rechargeable dispenser, comprising:

a bottle portion;

a resealable closure connected to said bottle portion, said resealable closure configured to be opened to allow liquid contents to flow therethrough and closed to seal said bottle portion, said resealable closure being a push-pull closure; and a cartridge configured to be disposed within said dispenser, said cartridge including at least one reservoir configured for containing and storing concentrate, said reservoir being disposed within said dispenser and within said bottle portion of said dispenser.

2. A dispenser according to claim 1, wherein said resealable closure is a push-pull closure.

3. A dispenser according to claim 2, wherein said at least one reservoir is disposed within said bottle portion.

4. A dispenser according to claim 1, wherein said cartridge is removably disposed within said bottle portion so that it can be removed when spent and replaced with another concentrate leaded cartridge.

5. A dispenser according to claim 1, wherein said cartridge is substantially permanently installed within said bottle portion to prevent its removal therefrom.

6. A dispenser according to claim 1, wherein said cartridge is defined by an integral unit having at least one chamber defining said reservoir.

7. A dispenser according to claim 6, wherein said chamber has an open top sealed by a membrane.

8. A dispenser according to claim 7, wherein said cartridge is defined by a cylinder divided up internally by at least one bisecting wall portion to define a plurality of chambers having secant shaped cross sections.

9. A dispenser according to claim 1, wherein said cartridge includes a plurality of separate reservoirs connected together.

10. A dispenser according to claim 9, wherein said separate reservoirs have the same size and shape configuration.

11. A dispenser according to claim 9, wherein said separate reservoirs have a different size and shape configuration.

12. A dispenser according to claim 1, wherein said insert is connected at an upper portion thereof to said bottle portion, and suspended inside said bottle portion.

13. A dispenser according to claim 1, wherein said at least one reservoir is associated with said closure.

14. A dispenser according to claim 1, wherein said at least one reservoir is connected to said closure.

15. A dispenser according to claim 1, wherein said cartridge is associated with said closure.

16. A device according to claim 1, wherein said cartridge is connected to said closure.

17. A device according to claim 16, wherein said cartridge is a separate unit and connected to said closure.

18. A device according to claim 17, wherein said cartridge is removably connected to said closure.

19. A dispenser according to claim 1, including an opening device for opening said reservoir.

20. A dispenser according to claim 19, wherein said opening device is a bayonet device.

21. A dispenser according to claim 20, wherein said bayonet device is connected to said closure.

22. A dispenser according to claim 21, wherein said bayonet device is rotatably connected to said closure.

23. A dispenser according to claim 20, wherein said bayonet is positioned off center relative to said closure.

24. A dispenser according to claim 1, wherein said cartridge is configured to allow the fluid contents to flow from said bottle portion to said closure.

25. A dispenser according to claim 24, wherein said cartridge is provided with a liquid passageway extending therethrough.

26. A dispenser according to claim 1, wherein said cartridge is provided with a plurality of separate chambers, said cartridge configured to be selectively opened.

27. A dispenser according to claim 26, including an opening device for selectively opening said plurality of separate chambers of said cartridge.

28. A dispenser according to claim 1, including product concentrate contained within said reservoir.

29. A dispenser according to claim 26, including at least one type of product concentrate contained within said plurality of separate chambers.

30. A dispenser according to claim 29, including different types of product concentrate contained within said plurality of separate chambers.

31. A dispenser according to claim 30, including reactive components of product concentrate contained within said plurality of separate chambers to be mixed together to form a reactive mixture within the dispenser.

32. A rechargeable dispenser, comprising:

a bottle;

a resealable closure connected to said bottle portion, said resealable closure configured to be selectively opened to allow liquid contents to flow therethrough and selectively closed to seal said bottle portion; and a cartridge configured to be disposed within the dispenser, said cartridge including multiple chambers configured to store multiple dosages of product concentrate and configured to be selectively opened.

* * * * *